US012681482B2

(12) United States Patent (10) Patent No.: US 12,681,482 B2

Williams et al. (45) Date of Patent: Jul. 14, 2026

(54) ADAPTIVE DETECT AND AVOID SYSTEM WITH INTEGRITY MONITORING

(71) Applicant: The Boeing Company, Chicago, IL (US)

(72) Inventors: Brendan Patrick Williams, Brisbane (AU); Reece Alexander Clothier, Richmond (AU); Natasha Bethany Moffat, Toowong (AU); Grace Shanti Garden, Brisbane (AU); Alex Lloyd Wainwright, Brisbane (AU); Alexandra Kay Crawley, St. Lucia (AU); Solene Gabrielle Doreen Hegarty-Cremer, Brisbane (AU)

(73) Assignee: The Boeing Company, Arlington, VA (US)

( * ) Notice: Subject to any disclaimer, the term of this patent is extended or adjusted under 35 U.S.C. 154(b) by 267 days.

(21) Appl. No.: 17/744,011

(22) Filed: May 13, 2022

(65) Prior Publication Data

US 2022/0365545 A1 Nov. 17, 2022

Related U.S. Application Data

(60) Provisional application No. 63/188,445, filed on May 13, 2021.

(51) Int. Cl.
*G08G 5/00* (2025.01)
*G05D 1/00* (2006.01)
*G08G 5/80* (2025.01)

(52) U.S. Cl.
CPC ............. *G05D 1/1062* (2019.05); *G08G 5/80* (2025.01)

(58) Field of Classification Search
CPC ............................ G07G 5/045; G05D 1/1062
(Continued)

(56) References Cited

U.S. PATENT DOCUMENTS

2008/0042814 A1* 2/2008 Hurwitz ............... B60W 50/14
340/439
2011/0160950 A1* 6/2011 Naderhirn ............. G08G 5/045
701/28
(Continued)

FOREIGN PATENT DOCUMENTS

CN 111983936 B * 4/2024 ............... B64F 5/60

OTHER PUBLICATIONS

Extended European Search Report, Application No. 22172396.8, Mailed Oct. 17, 2022.
(Continued)

*Primary Examiner* — Erin M Piateski
*Assistant Examiner* — Michael T Dowling
(74) *Attorney, Agent, or Firm* — Harrity & Harrity, LLP

(57) ABSTRACT

An apparatus is provided for detecting and avoiding objects in real-time. The apparatus includes a first sensor that collects environmental data and a second sensor that collects external data corresponding to an external object within a detection range from the apparatus. The apparatus further includes a processor that, in real-time, calculates a minimum distance to avoid the external object, based at least in part on the environmental data and the external data, monitors the environmental data and the external data, and controls the apparatus to avoid the external object based on the calculated minimum distance and the monitored environmental data and external data.

20 Claims, 12 Drawing Sheets

(58) Field of Classification Search
USPC ............................................................. 701/3
See application file for complete search history.

(56)                         References Cited

U.S. PATENT DOCUMENTS

| | | | |
|---|---|---|---|
| 2017/0169627 A1* | 6/2017 | Kim ...................... | G01S 13/862 |
| 2018/0284793 A1* | 10/2018 | Wood ................... | G05D 1/0055 |
| 2019/0068829 A1* | 2/2019 | Van Schoyck ......... | G05D 1/101 |
| 2019/0385463 A1* | 12/2019 | Cantrell ............... | G08G 5/0034 |
| 2020/0043350 A1 | 2/2020 | Cantrell et al. | |
| 2020/0166956 A1* | 5/2020 | Stoschek ............... | G01S 7/4802 |
| 2020/0409395 A1* | 12/2020 | Hilliges ................. | B64U 10/14 |
| 2021/0089058 A1 | 3/2021 | Stoschek et al. | |
| 2021/0089134 A1* | 3/2021 | Tran .................... | G08G 5/0039 |

OTHER PUBLICATIONS

Fulton, N.L., et al., "Aircraft Proximity: a synthesis of Apollonius, X-track, and Well Clear vol. paradigms", 2018 IEEE/AIAA 37th Digital Avionics Systems Conference (DASC), IEEE, Sep. 23, 2018, pp. 1-10, XP033469459, DOI:10.1109/DASC.2018.8569870.

* cited by examiner $$R = [k/(k^2-1)].R_{LOS}$$

$$k = \frac{\|V_1\|}{\|V_2\|}$$

ADAPTIVE DETECT AND AVOID SYSTEM WITH INTEGRITY MONITORING

CROSS-REFERENCE TO RELATED APPLICATION

This application claims priority to U.S. Provisional Patent Application No. 63/188,445, entitled "ADAPTIVE DETECT AND AVOID SYSTEM WITH INTEGRITY MONITORING," filed on May 13, 2021, the disclosure of which is incorporated herein by reference in its entirety.

BACKGROUND

Detect and avoid (DAA) systems depend on environmental conditions, the performance of other technical systems, e.g., latency in communications links, and characteristics of the vehicle in which the DAA system operates. Safety critical aviation systems, for example, not only must perform to acceptable standards, but are required to inform the system and its user when there is a fault, degradation, or invalidity. Current vehicular solutions utilize static models and calculations are based on extensive simulations. However, these solutions are not able to monitor and update in real-time.

SUMMARY

The disclosed examples are described in detail below with reference to the accompanying drawing figures listed below. The following summary is provided to illustrate examples or implementations disclosed herein. It is not meant, however, to limit all examples to any particular configuration or sequence of operations.

In one implementation, an apparatus for detecting and avoiding objects in real-time is provided. The apparatus includes a first sensor that collects environmental data and a second sensor that collects external data corresponding to an external object within a detection range from the apparatus. The apparatus further includes a processor that, in real-time, calculates a minimum distance to avoid the external object, based at least in part on the environmental data and the external data, monitors the environmental data and the external data, and controls the apparatus to avoid the external object based on the calculated minimum distance and the monitored environmental data and external data.

Other technical features may be readily apparent to one skilled in the art from the following figures, descriptions, and claims.

BRIEF DESCRIPTION OF THE DRAWINGS

For a more complete understanding of the present disclosure and its advantages, reference is now made to the following description taken in conjunction with the accompanying drawings, in which like reference numerals represent like parts:

Corresponding reference characters indicate corresponding parts throughout the drawings. In FIGS. 1 to 11, the systems are illustrated as schematic drawings. The drawings may not be to scale.

DETAILED DESCRIPTION

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all implementations.

The foregoing summary, as well as the following detailed description of certain implementations will be better understood when read in conjunction with the appended drawings. As used herein, an element or step recited in the singular and preceded by the word "a" or "an" should be understood as not necessarily excluding the plural of the elements or steps. Further, references to an implementation or an example are not intended to be interpreted as excluding the existence of additional examples that also incorporate the recited features. Moreover, unless explicitly stated to the contrary, examples "comprising" or "having" an element or a plurality of elements having a particular property could include additional elements not having that property.

Various implementations of the present disclosure execute an adaptive detect and avoid (DAA) system with integrity monitoring. For example, the present disclosure quantifies and evaluates both the expected performance and required performance of the DAA system to either adjust the DAA outputs, e.g., traffic advisories and alerts, to ensure suitable separation assurance or collision avoidance, or, if minimum performance cannot be maintained through adjustment, report an integrity flag to inform a user of the information.

Figure 1A:
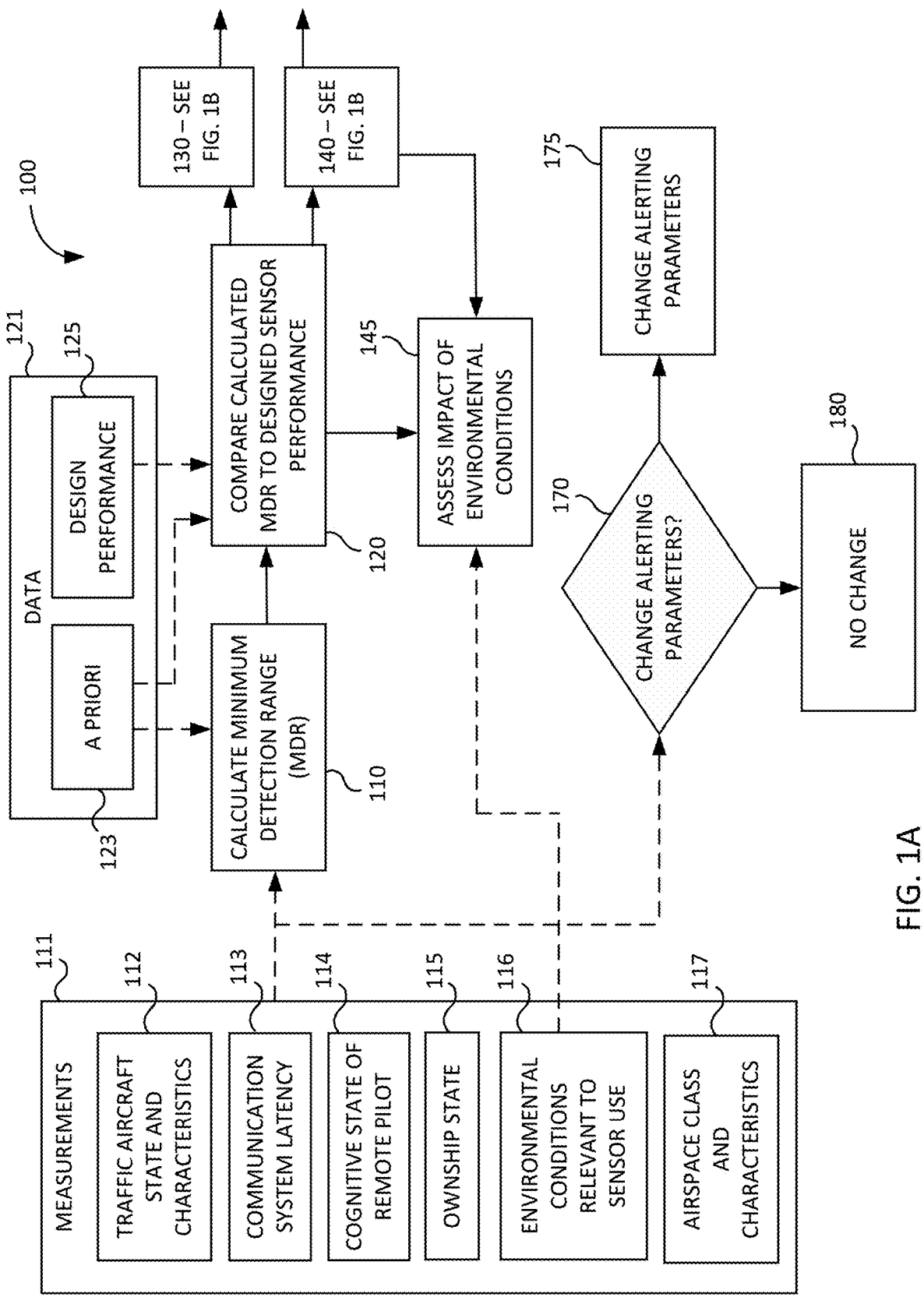
FIGS. 1A and 1B illustrate a method of a detect and avoid (DAA) system according to various implementations of the present disclosure.
Figure 1B:
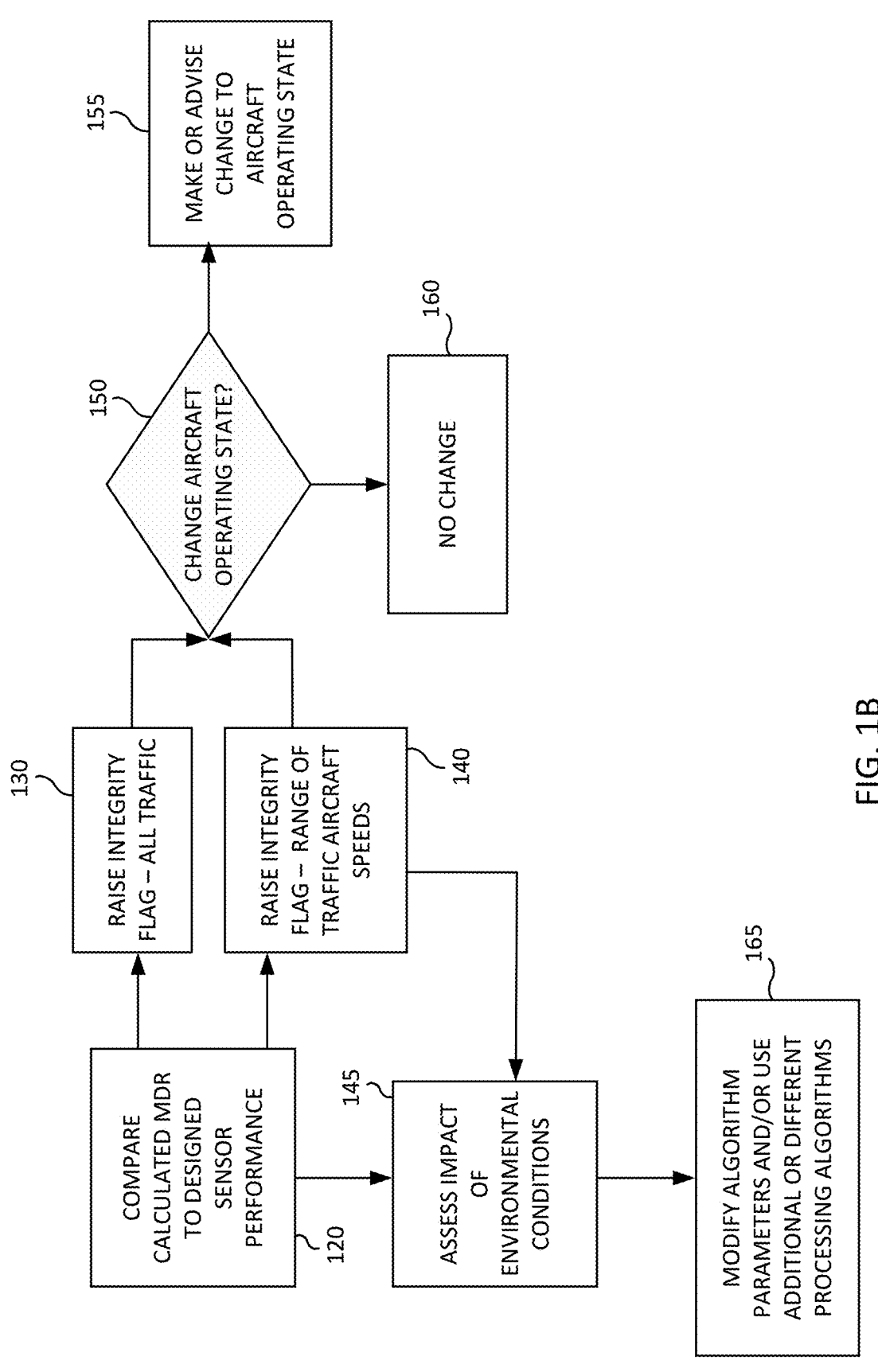

FIGS. 1A and 1B illustrate a method of a detect and avoid (DAA) system according to various implementations of the present disclosure. The example of the method 100 illustrated in FIGS. 1A and 1B is for illustration only. Other examples of the method 100 can be used or implemented without departing from the scope of the present disclosure. FIG. 1B illustrates a continuation of the method 100 illustrated in FIG. 1A.

In some implementations, the method 100 is implemented on a vehicle, such as an aircraft 1000, that includes electronic components of the electronic device 900, described in greater detail with reference to FIGS. 9 and 10 below. In one example, the vehicle is an unmanned aircraft. In another example, the vehicle is a manned aircraft. However, various implementations are possible. The vehicle on which the method 100 is implemented can be a drone, a car, a truck, a boat, a motorcycle, or any other vehicle that can detect and avoid objects.

In operation 110, a minimum detection range (MDR) $R_{LOS}$ is calculated. The MDR is dynamically, or adaptively, calculated. In other words, the MDR is calculated online by the vehicle in real-time. In some implementations, the MDR is dynamically calculated at regular intervals as the vehicle moves, such as every second, every two seconds, or every five seconds, etc. To calculate the MDR, the vehicle takes into account various measurements 111 and data 121. The measurements 111 can include, but are not limited to, measurements of the state and characteristics of the traffic aircraft 112, communication system latency 113, the cognitive state of the remote pilot 114 in implementations where the vehicle is unmanned, the state of the vehicle 115, environmental conditions relevant to a particular sensor in use 116, and the airspace class and characteristics 117.

The data 121 can include a priori data 123 such as, but is not limited to, data stored in a memory of the vehicle, such as the memory 920. Examples of a priori data 123 include a velocity of the vehicle, a speed ratio of traffic pairs, such as the vehicle and a detected object to avoid, well clear volume parameters, mid-air collision volume parameters, a minimum turn rate required to avoid the detected object, a reaction time of the vehicle and/or operator of the vehicle, and processor latency.

Well clear volume parameters refer to three-dimensional (3D) parameters for a volume within which the vehicle is expected to remain "well clear" of an object. Mid-air collision volume parameters refer to 3D parameters for a volume within which a mid-air collision is likely. The MDR is calculated according to the speed, direction, and location of the vehicle relative to the detected object. For example, FIGS. 2A-3B illustrate various examples of methods to calculate the MDR, but other methods can be used without departing from the scope of the present disclosure.

Although calculating an MDR is described herein, for simplicity, as being a range directly ahead of the aircraft 1000, the MDR can be calculated for any direction of the aircraft 1000 in a spherical range surrounding the aircraft

1000. In other words, an MDR from the aircraft 1000 can be calculated to the side of the aircraft 1000, above the aircraft 1000, below the aircraft 1000, to the rear of the aircraft 1000, or any other direction within the spherical range.

The minimum turn rate is calculated to determine a radius of turn (R) in both feet required and rate of turn (ROT) in degrees per second. The radius of turn in feet (R) is calculated by $$R = \frac{V^2}{11.26 \times \tan\phi}$$

where V has units of knots and a bank angle in degrees. The rate of turn (ROT) is calculated by $$ROT = \frac{1091 \times \tan\phi}{V}$$

where V has units of knots and a bank angle in degrees.

Figures 2A, 2B:
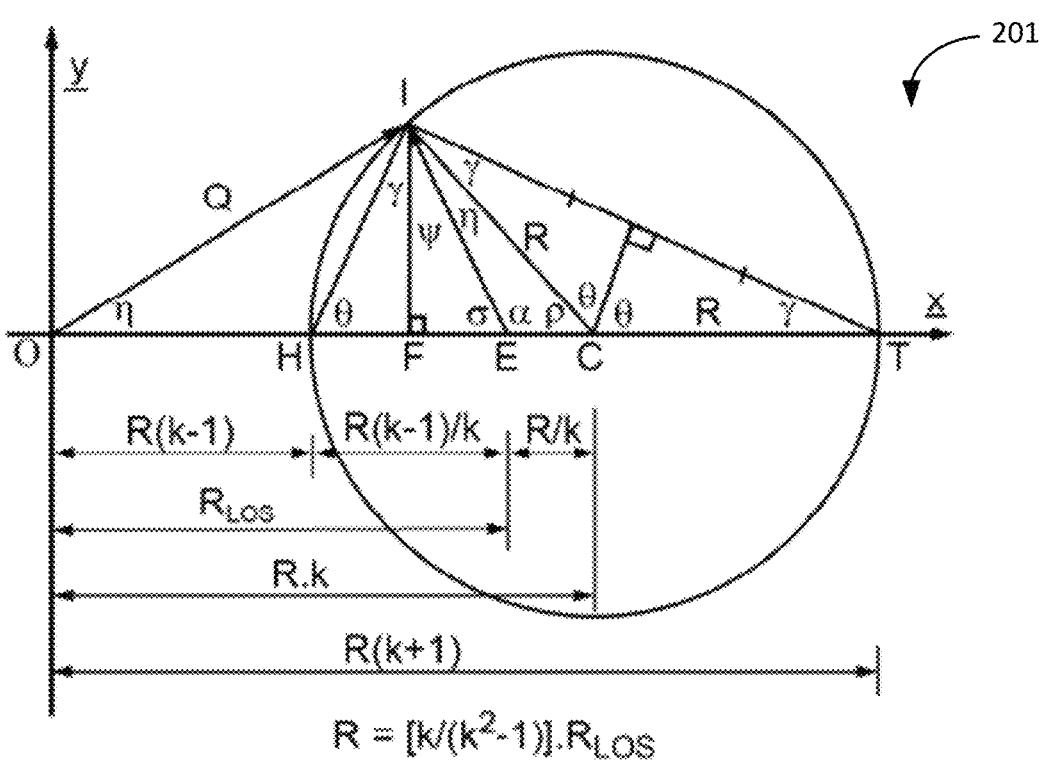
FIG. 2A illustrates the geometry of the Apollonius circle according to various implementations of the present disclosure.
FIG. 2B illustrates a model of a detection range by applying the geometry of the Apollonius circle according to various implementations of the present disclosure.

In some implementations, the Apollonius theorem is applied to determine a distance of both the vehicle and a detected object from a potential collision location, or point. For example, FIG. 2A illustrates the geometry of the Apollonius circle according to various implementations of the present disclosure. FIG. 2A depicts a graph 201 including an x- and y-axis. The graph includes an intercept point (I) connected to a plurality of points O, H, F, E, C, and T located at different values along the x-axis. The point C is the center of a circle that has a radius equal to the distance from C to I, C to T, and C to H. In the Apollonius circle depicted in FIG. 2A, $R=[k/(k^2-1)]*R_{LOS}$. The distance from E to H can be calculated by $$\overrightarrow{EH} = R\frac{(k-1)}{k} = \left[\frac{k}{(k^2-1)}\right]R_{LOS}\frac{(k-1)}{k} = \frac{1}{k+1}R_{LOS}.$$

The distance from O to H can be calculated by $$\overrightarrow{OH} = R(k-1) = \left[\frac{k}{(k^2-1)}\right]R_{LOS}(k-1) = \frac{k}{k+1}R_{LOS}.$$

FIG. 2B illustrates a model of a detection range by applying the geometry of the Apollonius circle according to various implementations of the present disclosure. For example, the model in FIG. 2B illustrates a graph 203 with an x-axis and a y-axis. A first aircraft 205 is shown at approximately point (0, 0) and a second aircraft 207 is shown at y=0 with an x value of $R_{LOS}$. As shown, the first aircraft 205 has a first velocity on a trajectory with a positive slope and the second aircraft 207 has a second velocity on a trajectory with a constant x value and increasing y value. The trajectories of the first aircraft 205 and second aircraft 207 intersect at a point $W_x$ on the graph 203. The angle between the intersection of the two slopes $W_x$ at is shown as θ. A value k can be calculated by $$k = \frac{\|V1\|}{\|V2\|}.$$

As shown in FIG. 2B, applying the Apollonius theorem can determine the intercept point (I) when the vehicle and a detected object are not traveling toward one another in opposite directions, i.e., a head-on direction.

Figure 3A:
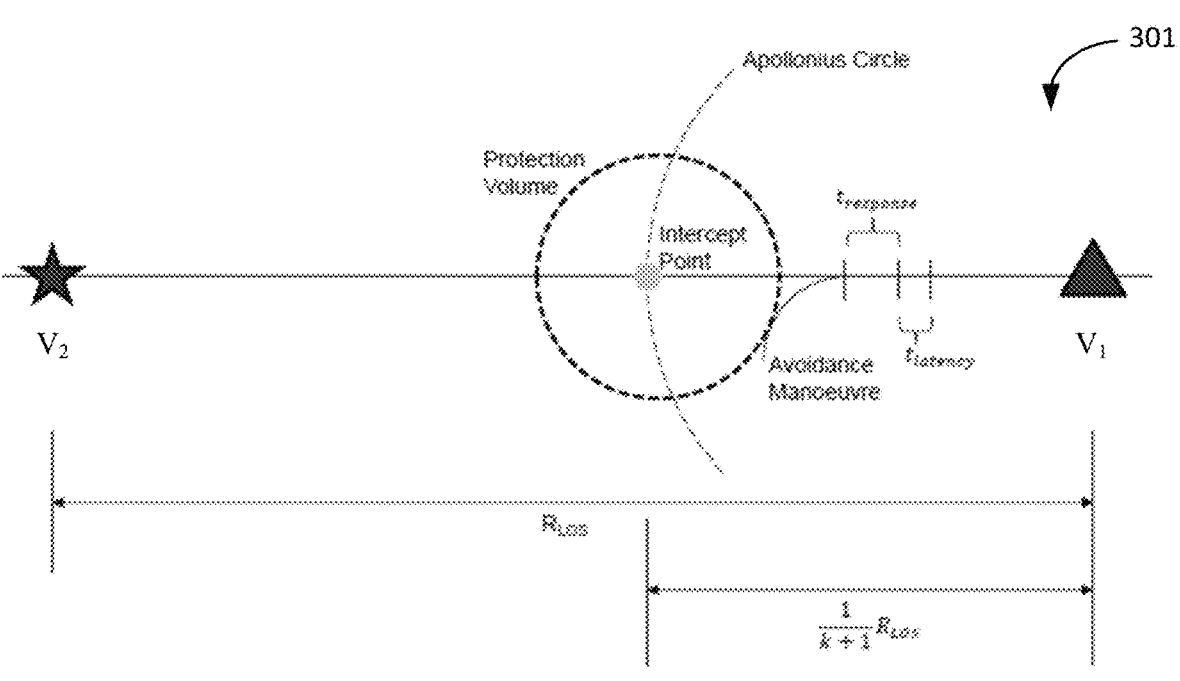
FIG. 3A illustrates a model of calculating a detection range according to various implementations of the present disclosure.

FIG. 3A illustrates a model of calculating a detection range according to various implementations of the present disclosure. The model 301 illustrated in FIG. 3A is used to calculate the minimum detection range $R_{LOS}$ between the vehicle $V_1$ and the detected object $V_2$ when the vehicle is moving at a lower velocity than a detected object. For example, the model 301 illustrates the vehicle $V_1$ headed toward a detected object $V_2$ and the detected object $V_2$ headed toward the vehicle $V_1$ at a velocity greater than the velocity at which the vehicle $V_1$ is moving. The distance between the vehicle $V_1$ and the intercept point between the detected object $V_2$ and the detected object $V_2$ is defined by $$\frac{1}{k+1}R_{LOS}.$$

The model 301 further includes an Apollonius Circle, the radius of which is the distance between the intercept point and the vehicle $V_1$. The intercept point is also the center of a circle illustrating the protection volume, which is a volume of space surrounding the intercept point to be protected to mitigate the risk of collisions. The size of the protection volume, i.e., the amount of space in the protection volume, can be dependent upon the velocity, altitude, and direction of the vehicle $V_1$ or the detected object $V_2$.

Prior to reaching the intercept point, the vehicle $V_1$ reaches a $t_{latency}$ point. The $t_{latency}$ measures a delay of time (latency) accounting for communication path and system delays, processing delays, and other system delays. Following the $t_{latency}$ period is a $t_{response}$ period. The $t_{response}$ measures a delay of time to recognize the need to perform an avoidance maneuver and then a delay of time between recognizing the need to perform an avoidance maneuver and beginning to perform the avoidance maneuver. The size of the $t_{response}$ period can depend on the processing speed of the vehicle $V_1$, the response time of a user manning the vehicle $V_1$ in implementations where the vehicle $V_1$ is manned, any dynamic response time of the vehicle to commence a maneuver after being commanded, or other, additional factors. For example, in implementations where the vehicle is manned, $t_{latency}$ can include the time required for the pilot to recognize and comprehend an alert that an object has been detected and requires an avoidance maneuver. For example, $t_{latency}$ can be one second and $t_{response}$ can be five seconds. In this example, the total time from recognizing the need to perform an avoidance maneuver to executing the avoidance maneuver is six seconds, including any communication and processing delays. The avoidance maneuver is any maneuver of the vehicle to avoid the detected object $V_2$. In some implementations, the avoidance maneuver is a turn, a swerve, a roll, a climb, a descent, or any other suitable maneuver to avoid the detected object $V_2$.

In some implementations, a time required to perform an operation can be converted to a distance in order to calculate the minimum detection range $R_{LOS}$. For example, $d_{protection}$ is equal to a minimum separation distance requirement (i.e., Well Clear Volume (WCV), Mid-Air Collision Volume (MACV), or other separation requirement), $$d_{maneuver} = \frac{|V_1|^2}{11.26 \times \tan\phi}, \, d_{response} = |V_1| * t_{response},$$

$$\text{and } d_{latency} = |V_1| * t_{latency}.$$

The minimum detection range is the value of $R_{LOS}$ when $$\frac{1}{k+1}R_{LOS} = d_{protection} + d_{maneuver} + d_{response} + d_{latency}.$$

Figure 3B:
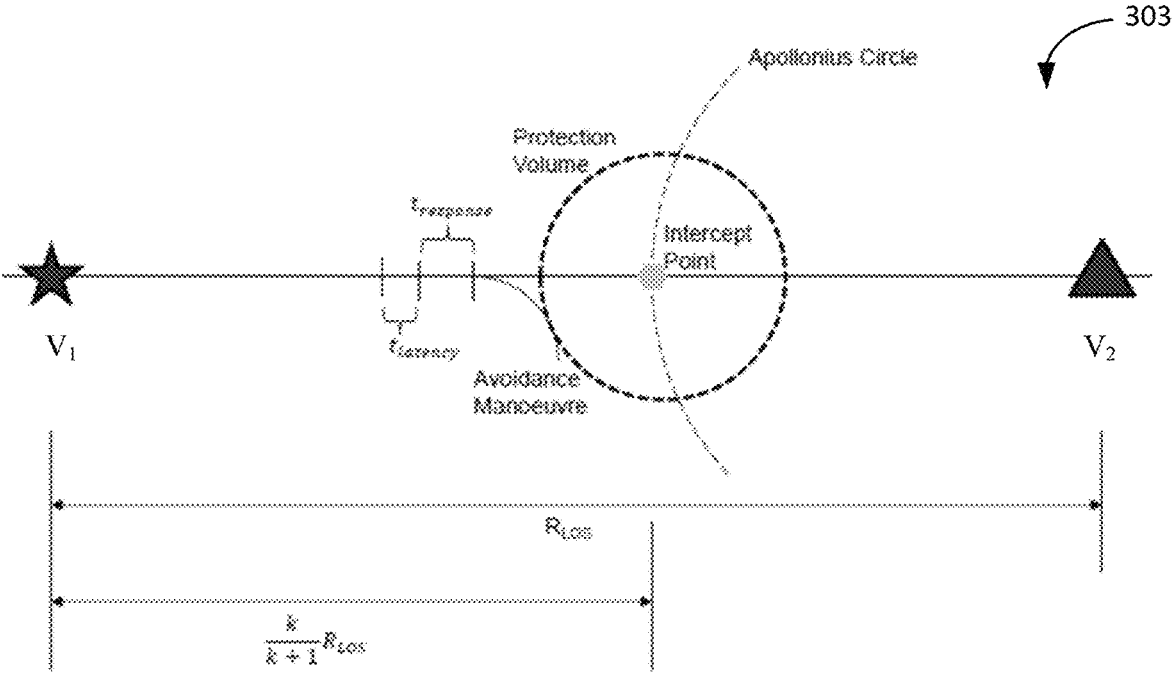
FIG. 3B illustrates a model of calculating a detection range according to various implementations of the present disclosure.

FIG. 3B illustrates a model of calculating a detection range according to various implementations of the present disclosure. The model 303 illustrated in FIG. 3B is used to calculate the minimum detection range $R_{LOS}$ between the vehicle $V_1$ and the detected object $V_2$ when the vehicle $V_1$ is moving at a greater velocity than the detected object $V_2$. For example, the model 303 illustrates the vehicle $V_1$ headed toward a detected object $V_2$ and the detected object $V_2$ headed toward the vehicle $V_1$ at a velocity less than the velocity at which the vehicle $V_1$ is moving. The distance between the vehicle $V_1$ and the intercept point between the detected object $V_2$ and the detected object $V_2$ is defined by $$\frac{k}{k+1}R_{LOS}.$$

The model 303 further includes an Apollonius Circle, the radius of which is the distance between the intercept point and the vehicle $V_2$. The intercept point is also the center of a circle illustrating the protection volume, which is a volume of space surrounding the intercept point to be protected to mitigate the risk of collisions. The size of the protection volume, i.e., the amount of space in the protection volume, can be dependent upon the velocity, altitude, and direction of the vehicle $V_1$ or the detected object $V_2$.

Prior to reaching the intercept point, the vehicle $V_1$ reaches a $t_{latency}$ point. The $t_{latency}$ measures a delay of time (latency) accounting for communication path and system delays, processing delays, and other system delays. Following the $t_{latency}$ period is a $t_{response}$ period. The $t_{response}$ measures a delay of time to recognize the need to perform an avoidance maneuver and then a delay of time between recognizing the need to perform an avoidance maneuver and beginning to perform the avoidance maneuver.

The size of the $t_{response}$ period can depend on the processing speed of the vehicle $V_1$, the response time of a user manning the vehicle $V_1$ in implementations where the vehicle $V_1$ is manned, any dynamic response time of the vehicle to commence a maneuver after being commanded, or other, additional factors. For example, in implementations where the vehicle is manned, $t_{latency}$ can include the time required for the pilot to recognize and comprehend an alert that an object has been detected and requires an avoidance maneuver. For example, $t_{latency}$ can be one second and $t_{response}$ can be five seconds. In this example, the total time from recognizing the need to perform an avoidance maneuver to executing the avoidance maneuver is six seconds, including any communication and processing delays.

The avoidance maneuver is any maneuver of the vehicle to avoid the detected object $V_2$. In some implementations, the avoidance maneuver is a turn, a swerve, a roll, a climb, a descent, or any other suitable maneuver to avoid the detected object $V_2$.

In some implementations, a time required to perform an operation can be converted to a distance in order to calculate the minimum detection range $R_{LOS}$. For example, $d_{protection}$ is equal to a minimum separation distance requirement (i.e., Well Clear Volume (WCV), Mid-Air Collision Volume (MACV), or other separation requirement), $$d_{maneuver} = \frac{|V_1|^2}{11.26 \times \tan\phi}, d_{response} = |V_1| * t_{response},$$

$$\text{and } d_{latency} = |V_1| * t_{latency}.$$

The minimum detection range is the value of $R_{LOS}$ when $$\frac{k}{k+1} R_{LOS} = d_{protection} + d_{maneuver} + d_{response} + d_{latency}.$$

In operation 120, the calculated MDR is compared to the designed sensor performance of a sensor onboard the vehicle, such as one of the sensors 940, to measure the performance of the sensor. In some implementations, the a priori data 123 and the designed sensor performance 125 are stored in the memory 920 and retrieved by the processor 905 in order to perform the comparison in operation 120. The designed sensor performance 125 includes subsets, or ranges, of performance based on traffic aircraft speeds and own vehicle speeds. For example, the sensor 940 can perform suitably at some speeds, but not suitably at others. If the calculated MDR is greater than all subsets of the required sensor performance, in operation 130 an integrity flag is raised to indicate that the sensor 940 cannot provide sufficient alerting to maintain separation against all traffic.

In some implementations, in operation 130 the sensor 940 is referred to as in a full failure mode due to being unable to provide sufficient alerting to maintain separation against all traffic. The integrity flag can be raised to an operator of the vehicle to alert the operator of the insufficiency of the sensor. For example, in implementations where the vehicle is manned the integrity flag is raised to the pilot and output on a display or user interface within the cockpit, such as the display 935. In implementations where the vehicle is unmanned, the integrity flag is raised to a remote pilot or operator and transmitted to an external device at the location of the operator.

If the calculated MDR is greater than a subset of the required sensor performance, but not all subsets of the required sensor performance, in operation 140 an integrity flag is raised to indicate that the sensor cannot provide sufficient alerting to maintain separation against a range of traffic aircraft speeds. In some implementations, in operation 140 the sensor is referred to as in a partial failure mode due to being unable to provide sufficient alerting to maintain separation against some traffic, but able to provide sufficient alerting to maintain separation against other traffic.

Based on the integrity flag being raised in operation 130 and/or in operation 140, in operation 150 the processor 905 determines whether a change in the operating state of the aircraft 1000 would overcome the limitations leading to the raising of the integrity flag and maintain safety requirements. For example, the sensor 940 can be determined to be functioning at a level capable of correction through changing the operating state of the aircraft or can be determined not to be functioning at a level capable of correction through changing the operating state of the aircraft.

In implementations where the sensor 940 is not to be functioning at a level capable of correction through changing the operating state of the aircraft, the sensor 940 is in need of correction through additional corrections instead of or in addition to the operating state of the aircraft. In operation 155, based on the determining in operation 150 that a change in the operating state of the aircraft 1000 would overcome the limitations leading to the raising of the integrity flag and maintain safety requirements, the change to the operating state of the aircraft is made or advised. In implementations where the aircraft 1000 is manned, the change to the operating state is advised to the pilot or remote pilot. In implementations where the aircraft 1000 is unmanned, the change to the operating state is made to the aircraft 1000. In operation 160, based on the determining in operation 150 that a change in the operating state of the aircraft 1000 would overcome the limitations leading to the raising of the integrity flag and maintain safety requirements, the change to the operating state of the aircraft is not made or advised.

If the calculated MDR is less than all subsets of the required sensor performance, the sensor 940 is determined to be operating sufficiently. Accordingly, in operation 145 an integrity flag is not raised and an impact of environmental conditions is assessed. In some implementations, the impact assessment in operation 145 includes an assessment of the measured environmental conditions relevant to a particular sensor in use 116. In some implementations, operation 145 includes providing a notice to the operator of the vehicle that the sensor 940 is functioning properly. In some implementations, in operation 165, the algorithm parameters are modified and/or additional or different processing algorithms are utilized. The additional or different processing algorithms can better respond to the detected characteristics, or modifying the algorithm parameters, to improve performance of the method 100.

In some implementations, the measurements 111 are used to determine whether alerting parameters can be changed to improve the DAA system of the aircraft 1000. In operation 170, the processor 905 determines whether a change in alerting parameters would overcome limitations and maintain safety requirements of the DAA system. Based on determining the change would overcome limitations and maintain safety requirements, in operation 175 the processor 905 makes the change in alerting parameters. In various implementations, the processor 905 expands or condenses the alerting parameters to overcome the limitations and maintain the safety requirements. In various implementations, the processor 905 increases or decreases the alerting parameters to overcome the limitations and maintain the safety requirements. Based on determining the change would not overcome limitations and maintain safety requirements, in operation 180 the processor 905 does not change the alerting parameters.

In some implementations, the method 100 runs at a regular intervals on the aircraft 1000. For example, the method 100 can run at regular intervals of every second, five seconds, ten seconds, thirty seconds, one minute, five minutes, or ten minutes, among other time intervals. In some implementations, the system runs continuously on a loop such that following operation 130, operation 140, or operation 145, the method 100 begins again at operation 110.

As described in FIGS. 3A and 3B, the aircraft 1000 can detect objects, such as other aircrafts, in a substantially straight line. However, in real world situations many objects can interfere with the path of the aircraft 1000 at other angles. For example, objects that can potentially interfere with the path of the aircraft 1000 can come from an angle to the side of the path of the vehicle, from above the path of the aircraft 1000, or below the path of the aircraft 1000. In some implementations, the path of the aircraft 1000 itself can also affect how objects are detected because the aircraft 1000 oftentimes travels on a path that is not straight and parallel to the ground. For example, at various points in flight the aircraft 1000 turns, ascends, and descends which can have an impact on the ability of the aircraft 1000 to detect an object. For these reasons, DAA systems must also be able to detect and avoid objects that are at an angle to the path of the aircraft 1000 and at various altitudes. Accordingly, various implementations of the present disclosure, such as those described with reference to FIGS. 4-6 below, provide models and mechanisms for detecting objects at an angle to the path of the aircraft 1000 and at various altitudes.

Figure 4:
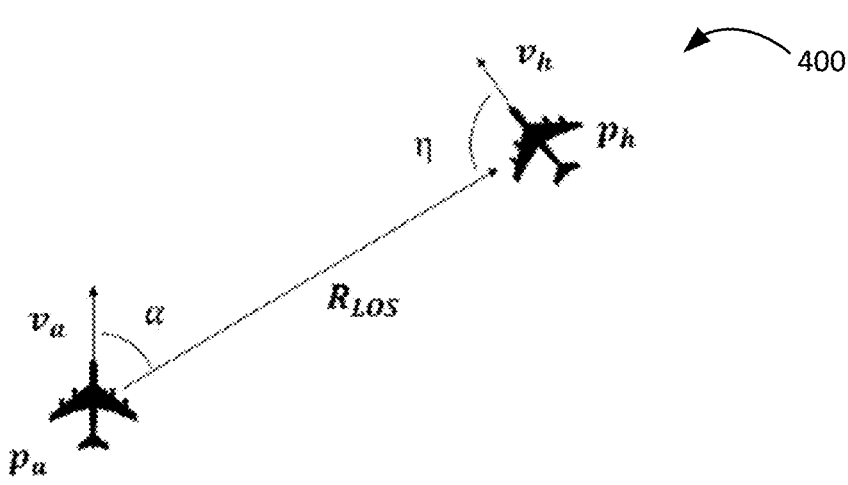
FIG. 4 illustrates a model of calculating a minimum detection distance according to various implementations of the present disclosure.

FIG. 4 illustrates a model of calculating a minimum detection distance according to various implementations of the present disclosure. The example of the model 400 illustrated in FIG. 4 is for illustration only. Other examples of calculating minimum detection distance can be used or implemented without departing from the scope of the present disclosure.

The minimum detection distance calculated by the model 400 is the last point on a vehicle's path where a hazard, such as a detected object, is required to have been detected by the vehicle for the vehicle to safely maintain separation, considering various flight dynamics of the vehicle, various system latencies, and various response times. As illustrated in FIG. 4, the position of the vehicle is shown as $p_a$ and the velocity of the vehicle is shown as $v_a$. The position of the hazard is shown as $p_h$ and the velocity of the hazard is shown as $v_a$. The MDR $R_{LOS}$ is calculated by $R_{LOS}=\|p_h-p_a+(v_h-v_a)\mu$. The point of required minimum detection of the vehicle, $w_a$, is calculated by $w_a=p_a+(TRTA-t_{latencies})*v_a$, where TRTA is the time remaining to act (TRTA). The point of required minimum detection by the vehicle of the hazard, $w_h$, is calculated by $w_h=p_h+(TRTA-t_{latencies})*v_h$. By using the calculated TRTA, the minimum detection distance can be calculated.

The minimum detection distance is an aircraft range of one or more sensors, such as the sensors 940 of the aircraft, when the vehicle is at the point of minimum detection. The minimum detection distance measures a required minimum distance at which a detect and avoid (DAA) sensor must be able to detect a hazard for the particular geometry illustrated in the model 400 in order to maintain sufficient separation. The minimum required detection distance is represented as $D_{minDetection}$ and takes into account not only the $R_{LOS}$ but also the additional lag time of the TRTA less the latencies described above. As described herein, $D_{minDetection}=\|w_h-w_a\|=\|p_h-p_a+(TRTA-t_{latencies})*(v_h-v_a)\|$. The minimum detection distance can be applied in several applications. In various implementations, the minimum detection distance is known and used to calculate the TRTA for various situations. For example, the TRTA for maintaining altitude, ascending, and descending can all be slightly different.

Figure 5A:
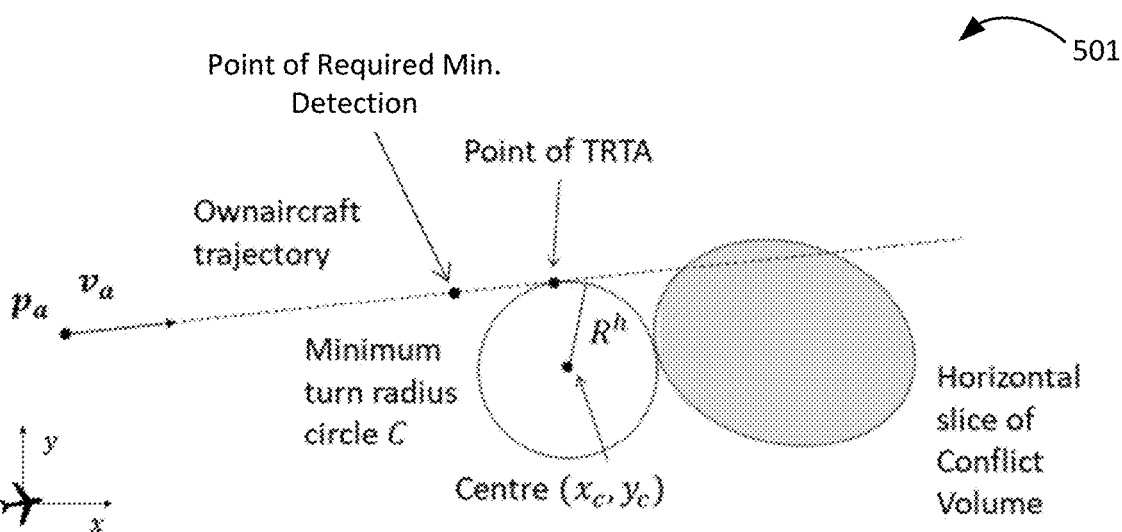
FIG. 5A illustrates a model of time remaining to act (TRTA) for a vehicle maintaining altitude according to various implementations of the present disclosure.
Figure 5B:
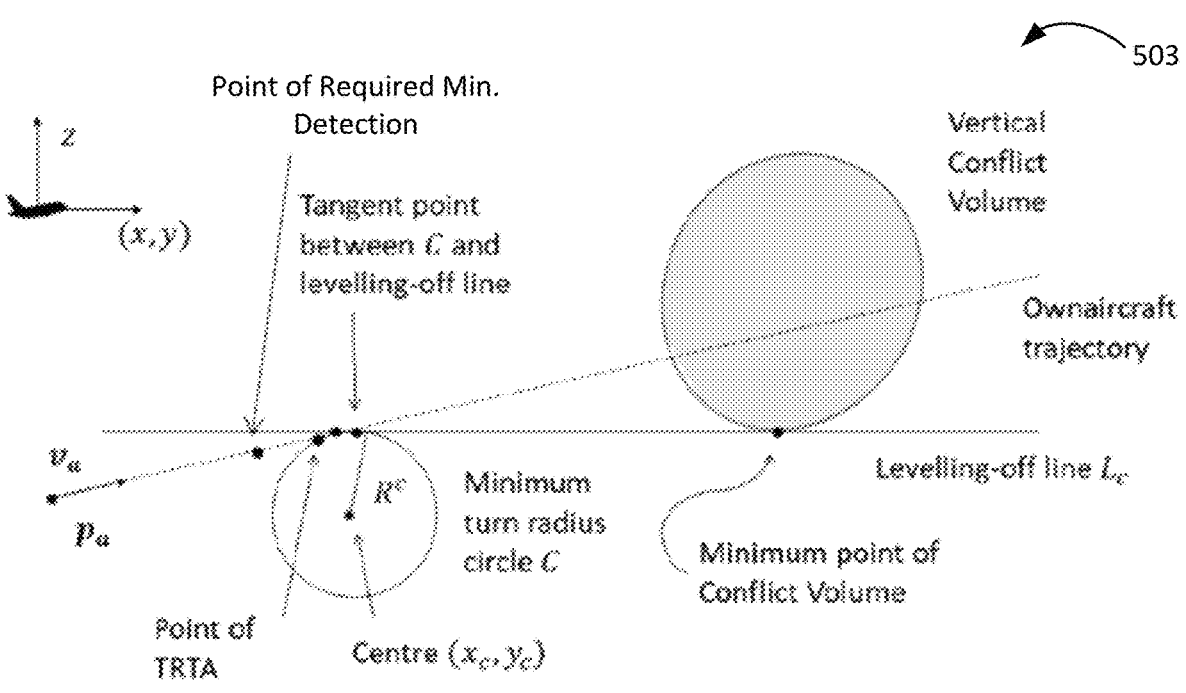
FIG. 5B illustrates a model of TRTA for a vehicle ascending according to various implementations of the present disclosure.
Figure 5C:
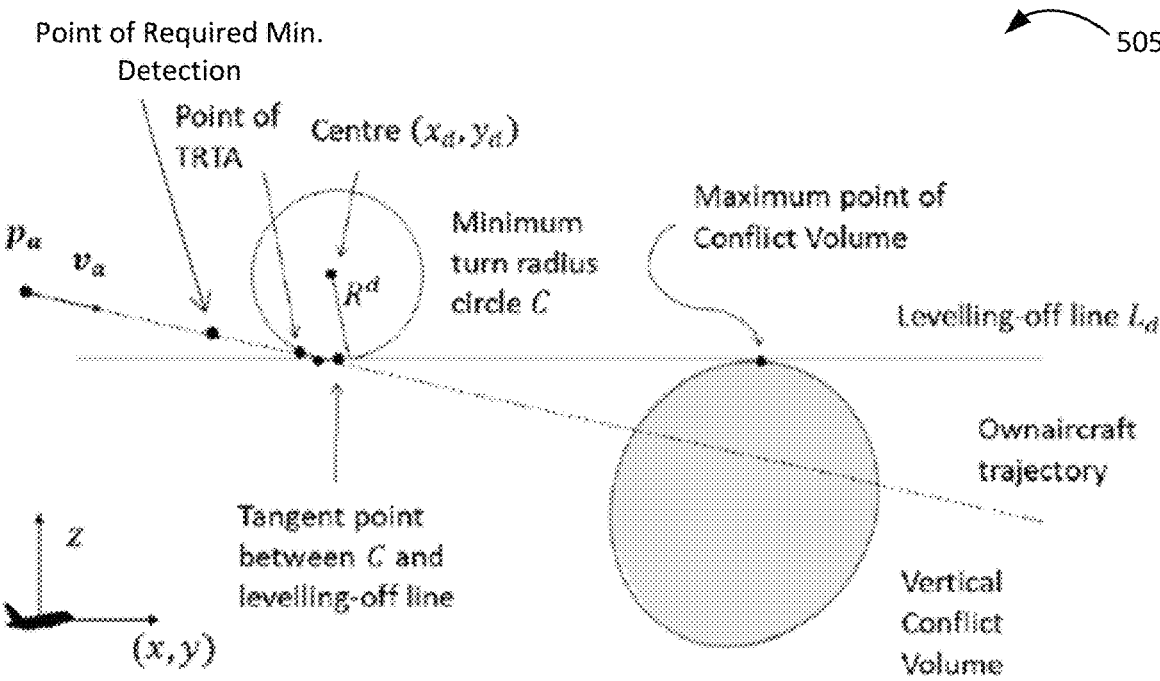
FIG. 5C illustrates a model of TRTA for a vehicle descending according to various implementations of the present disclosure.

FIGS. 5A-5C illustrate models of TRTA for a vehicle according to various implementations of the present disclosure. FIG. 5A illustrates a model 501 of time remaining to act (TRTA) for a vehicle maintaining altitude according to various implementations of the present disclosure. FIG. 5B illustrates a model 503 of TRTA for a vehicle ascending according to various implementations of the present disclosure. FIG. 5C illustrates a model 505 of TRTA for a vehicle descending according to various implementations of the present disclosure. The examples of the models 501, 503, 505 illustrated in FIGS. 5A-5C are for illustration only. Other examples of TRTA can be used or implemented without departing from the scope of the present disclosure.

FIG. 5A illustrates a model 501 of TRTA for a vehicle maintaining altitude. In other words, the model 501 is used when a vehicle, such as an aircraft, is maintaining an approximate altitude. The position of the vehicle is shown as $p_a$ and the velocity of the vehicle is shown as $v_a$ along a trajectory, or path. The model 501 includes a circle, C, that defines the turning radius of the vehicle. The center of the circle C is defined as $x_c$, $y_c$ and the radius of the circle C is defined as $R^h$. The circle C intersects the path of the vehicle and a horizontal slice of the conflict volume. In the model 501, the circle C is provided between the vehicle and the conflict volume. In other words, as the vehicle travels along the path, the vehicle approaches the point of required minimum detection, then the TRTA, then the conflict volume.

The conflict volume, as described herein, is a volume of space where a conflict, i.e., a collision between the vehicle and a detected object, is calculated to occur. In other words, the conflict volume is a volume surrounding an estimated point of collision. Using the conflict volume, rather than a singular point, allows some room for error to be incorporated into the calculations. The room for error can be attributed to errors and/or unknowns in the calculation, assumptions that are not precise, a change in speed of the vehicle or detected object, a change in altitude of the vehicle or detected, longer or shorter latency times than used in the calculation, and potential avoidance maneuvers performed by the detected object.

As described herein, the minimum detection distance is calculated by $D_{minDetection}=\|w_h-w_a\|=\|p_h-p_a+(TRTA-t_{latencies})*(v_h-v_a)\|$. The TRTA for the vehicle is the point at which the path of the vehicle intersects the circle C. The TRTA is calculated using the velocity $v_a$ of the vehicle. In other words, a higher velocity $v_a$ of the vehicle will result in a shorter TRTA whereas a lower velocity $v_a$ of the vehicle will result in a longer TRTA. The TRTA is also affected by altitude changes of the vehicle. For example, additional calculations are needed when the vehicle is ascending or descending. As shown in FIG. 5A, the model 501 includes x and y coordinates used to determine the position $p_a$ of the vehicle and the velocity $v_a$ of the vehicle. In contrast, FIGS. 5B and 5C, which illustrate calculating the TRTA when the vehicle is ascending and descending, respectively, also include z coordinates to determine the position $p_a$ of the vehicle and the velocity $v_a$ of the vehicle.

FIG. 5B illustrates a model 503 of TRTA for a vehicle that is ascending. The position of the vehicle is shown as $p_a$ and the velocity of the vehicle is shown as $v_a$ along a trajectory, or path. The trajectory of the vehicle is shown at an upward angle due to the vehicle ascending. The model 503 includes a circle, C, that defines the turning radius of the vehicle. The center of the circle C is defined as $x_c$, $y_c$ and the radius of the circle C is defined as $R^c$. The model 503 further includes a leveling line $L_c$ that intersects a minimum point of the vertical conflict volume. The vertical conflict volume is the same as the conflict volume illustrated in FIG. 5A. The leveling line $L_c$ is defined by a tangent point between the circle C and the minimum point of the vertical conflict volume. The TRTA for the ascending vehicle is calculated by defining the circle C that describes the turning radius of the vehicle that intersects the path of the vehicle and the leveling line $L_c$.

FIS. 5C illustrates a model 505 of TRTA for a vehicle that is descending. The position of the vehicle is shown as $p_a$ and the velocity of the vehicle is shown as $v_a$ along a trajectory, or path. The trajectory of the vehicle is shown at a downward angle due to the vehicle descending. The model 505 includes a circle, C, that defines the turning radius of the vehicle. The center of the circle C is defined as $x_c$, $y_c$ and the radius of the circle C is defined as $R^c$. The model 505 further includes a leveling line $L_c$ that intersects a maximum point of the vertical conflict volume. The vertical conflict volume is the same as the conflict volume illustrated in FIGS. 5A and 5B. The leveling line $L_c$ is defined by a tangent point between the circle C and the maximum point of the vertical conflict volume. The TRTA for the descending vehicle is calculated by defining the circle C that describes the turning radius of the vehicle that intersects the path of the vehicle and the leveling line $L_c$.

Figure 6A:
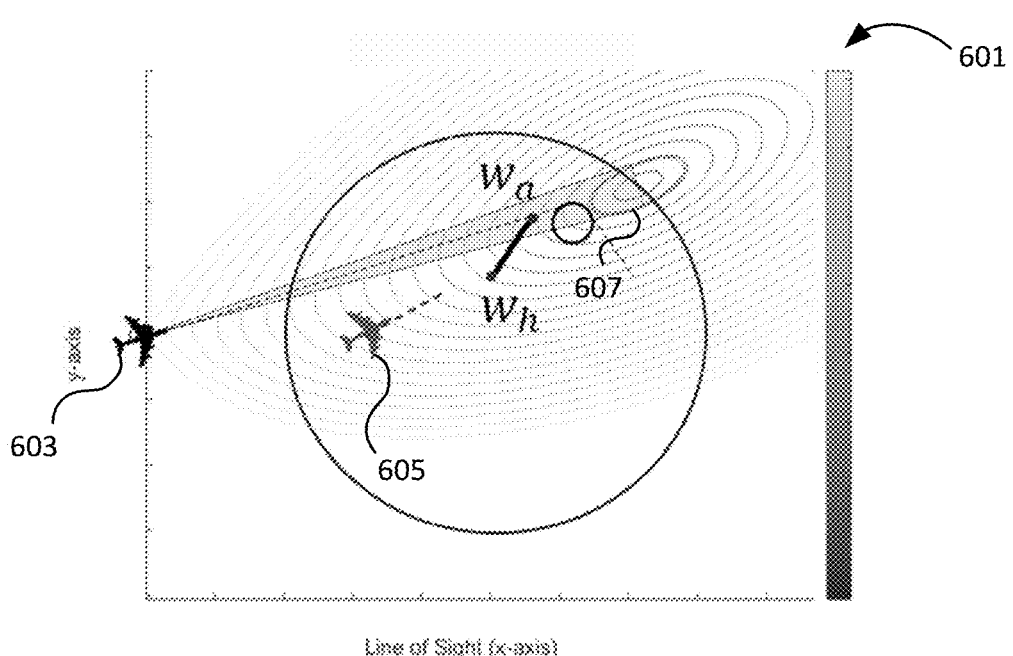
FIG. 6A illustrates a model of a minimum detection distance when a vehicle is moving at a greater velocity than a detected intruder according to various implementations of the present disclosure.

FIG. 6A illustrates a model of a minimum detection distance when a vehicle is moving at a greater velocity than a detected intruder according to various implementations of the present disclosure. The model 601 illustrated in FIG. 6A is for illustration only. Other examples of the model 601 can be used or implemented without departing from the scope of the present disclosure.

As shown in FIG. 6A, the model 601 includes a vehicle 603, such as the aircraft 1000, and an intruding object 605, such as another vehicle. The intruding object 605 can be another vehicle such as an aircraft, a piece of debris, or any other object that intrudes on the path of the vehicle 603. In some implementations, the intruding object 605 is an external object that is within a detection range of the vehicle 603. The model 601 further illustrates point of required minimum detection of the vehicle 603 as $w_a$ and the point of required minimum detection by the intruding vehicle as $w_h$. As discussed above in the description of FIG. 4, $w_a$, is calculated by $w_a = p_a + (TRTA - t_{latencies}) * V_a$ and $W_h = p_h + (TRTA - t_{latencies}) * v_h$. In the example illustrated in model 601, TRTA is calculated using the method of maintaining altitude discussed in the description of FIG. 5A, but other methods can be used without departing from the scope of the present disclosure. The line between $w_h$ and $w_a$ is an example minimum detection distance. As illustrated in FIG. 6A, the model 601 utilizes conflict volumes from the Apollonius contour of distance or time separation understanding of proximity to calculate the minimum detection distances. In various implementations, the model 601 is executed dynamically. In other words, the model 601 can be executed in real-time as the vehicle 603 is moving in order to detect and avoid the intruding object 605. As used or referenced herein, real-time is understood to mean substantially immediately and processing at a speed sufficient to keep up with an input data stream from the various sensors 940. In some examples, real-time processing includes processing fast enough to keep up with an input data stream from one or more sensors.

The model 601 is shown on an x-axis and a y-axis indicating distance and line of sight, respectively in the conflict plane. The conflict plane is a two-dimensional (2D) plane generally oriented in 3D space and is defined by $R_{LOS} \times V_R$, the Line of Sight vector between the aircraft and their Relative Velocity vector. FIG. 6A depicts the faster vehicle 603 by definition at the origin. Fixing the traffic aircraft's 605 speed and bearing and own-aircraft's 603 speed, and leaving the own-aircraft's free bearing allows contours based on relative range and time to separation breach to be constructed on the conflict plane. The contours have analogous surfaces in 3D space. The relative range contours are defined using the range between traffic aircraft and own-aircraft. The time contours are defined using the time to separation breach (that is, the time to the relative range being less than a specified threshold) between the traffic aircraft and own-aircraft. The contours allow construction of regions in the conflict plane that represent the space where a distance threshold and/or a time threshold are breached, respectively, which can then be used to define hazard zones 607.

The model 601 illustrates the vehicle 603 and the intruding object 605 on flight paths expected to intersect within a conflict volume 607. The conflict volume 607 is shown at approximately 3000 m along the x-axis. Because the vehicle 603 is positioned at 0 m, indicating at the time of the snapshot captured in FIG. 6A, the vehicle 603 is approximately 3000 m from the conflict volume 607. The time to reach the conflict volume 607 is calculable from the velocity of the vehicle 603, providing the vehicle 603 with a calculable amount of time to perform an avoidance maneuver. As shown, the vehicle 603 is moving at a greater velocity than the intruding object 605 due to the vehicle 603 traveling a greater distance to reach the conflict volume 607 than the intruding object 605 in the same amount of time.

Figure 6B:
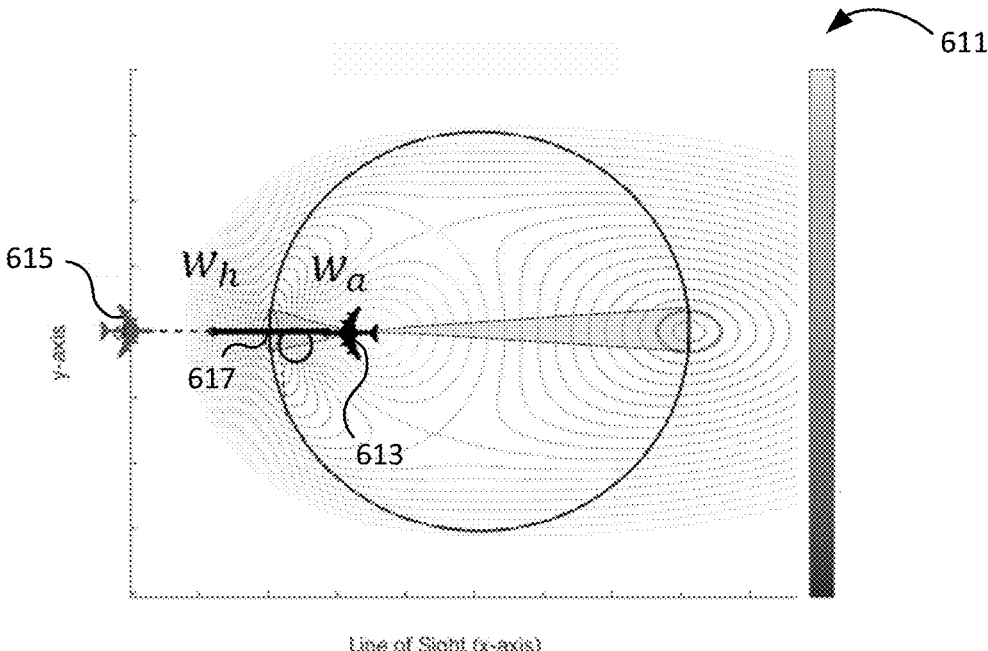
FIG. 6B illustrates a model of a minimum detection distance when a vehicle is moving at a lower velocity than a detected intruder according to various implementations of the present disclosure.

FIG. 6B illustrates a model of a minimum detection distance when a vehicle is moving at a lower velocity than a detected intruder according to various implementations of the present disclosure. The model 611 illustrated in FIG. 6B is for illustration only. Other examples of the model 611 can be used or implemented without departing from the scope of the present disclosure.

As shown in FIG. 6B, the model 611 includes a vehicle 613, such as the aircraft 1000, and an intruding object 615, such as another vehicle. The intruding object 615 can be another vehicle such as an aircraft, a piece of debris, or any other object that intrudes on the path of the vehicle 613. In some implementations, the intruding object 615 is an external object that is within a detection range of the vehicle 613. The model 611 further illustrates point of required minimum detection of the vehicle 613 as $w_a$ and the point of required minimum detection by the intruding object 615 as $w_h$. As discussed above in the description of FIG. 4, $w_a$, is calculated by $w_a = p_a + (TRTA - t_{latencies}) * v_a$ and $w_h = p_h + (TRTA - t_{latencies}) * v_h$. In the example illustrated in model 611, TRTA is calculated using the method of maintaining altitude discussed in the description of FIG. 5A, but other methods can be used without departing from the scope of the present disclosure. The line between $w_h$ and $w_a$ is an example minimum detection distance. As illustrated in FIG. 6B, the model 611 utilizes conflict volumes from the Apollonius contour of distance or time separation understanding of proximity to calculate the minimum detection distances. In various implementations, the model 611 is executed dynamically. In other words, the model 611 can be executed in real-time as the vehicle 613 is moving in order to detect and avoid the intruding object 615.

The model 611 is shown on an x-axis and a y-axis indicating distance and line of sight, respectively in the conflict plane. The conflict plane is a 2D plane generally oriented in 3D space and is defined by $R_{LOS} \times V_R$, the Line of Sight vector between the aircraft and their Relative Velocity vector. FIG. 6B depicts the faster intruding object 615 by definition at the origin. Fixing the traffic aircraft's 615 speed and bearing and own-aircraft's 613 speed, and leaving own-aircraft's free bearing allows contours based on relative range and time to separation breach to be constructed on the conflict plane. The contours have analogous surfaces in 3D space. The relative range contours are defined using the range between traffic aircraft and own-aircraft. The time contours are defined using the time to separation breach (that is, the time to the relative range being less than a specified threshold) between the traffic aircraft and own-aircraft. The contours allow construction of regions in the conflict plane that represent the space where a distance threshold and/or a time threshold are breached, respectively, which can then be used to define hazard zones 617.

In various implementations described herein, the calculated MDR and minimum detection distance are used to quantify and evaluate the expected and required performance of the DAA system, such as the DAA system implementing the method 100. By quantifying and evaluating the expected and required performance of the DAA system, implementations of the present disclosure are able to either adjust the DAA outputs, such as traffic advisories and alerts, to ensure suitable separation assurance or collision avoidance, or, if minimum performance is not able to be maintained through adjustment, report an integrity flag to inform a user of the system that the minimum performance in not able to be maintained through adjustment. In this manner, the DAA system implementing the method 100 allows for dynamic, i.e., real-time, adjustment of DAA outputs to account for changes in conditions or provide a means of integrity monitoring and alerting.

Figure 7:
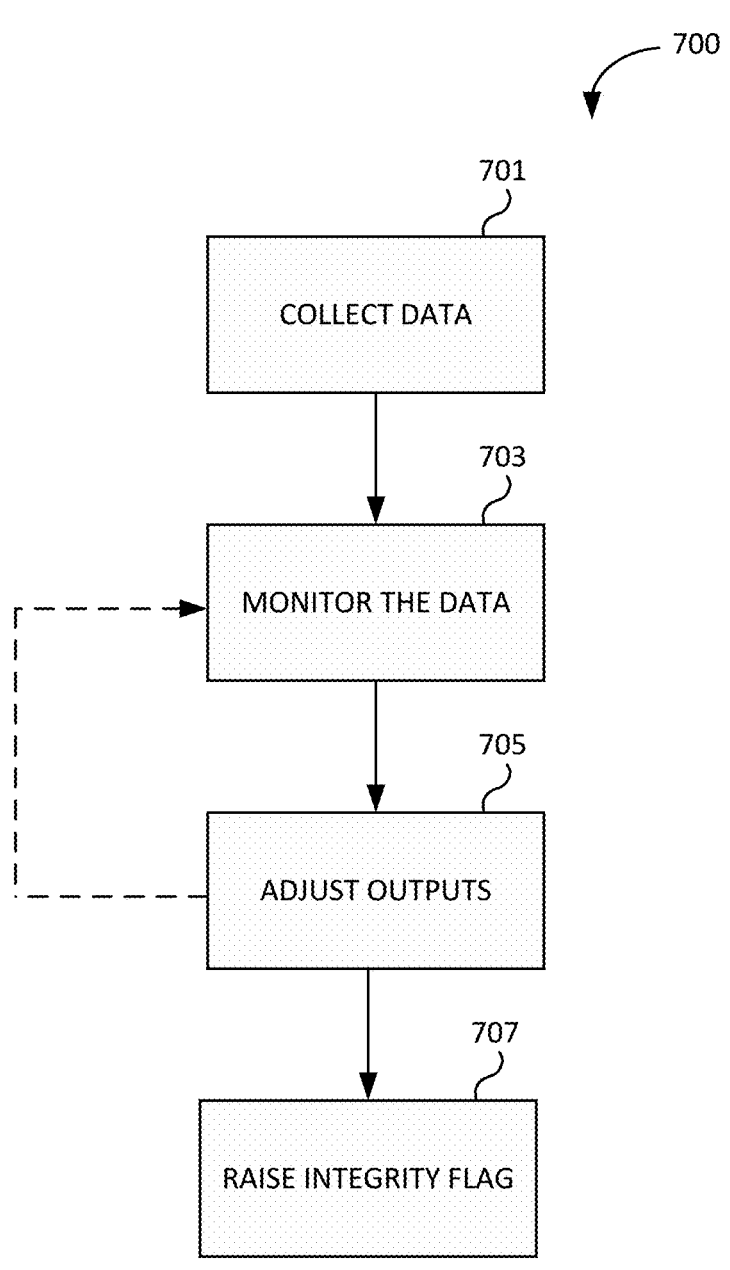
FIG. 7 illustrates an operational block diagram according to various implementations of the present disclosure.

For example, FIG. 7 illustrates a detect and avoid (DAA) system according to various implementations of the present disclosure. The system 700 illustrated in FIG. 7 is for illustration only. Other examples of the system 700 be used or implemented without departing from the scope of the present disclosure.

In some implementations, the system 700 is implemented on a vehicle, such as an aircraft 1000, that includes electronic components of the electronic device 900, described in greater detail with reference to FIG. 9 below. In one example, the vehicle is an unmanned aircraft. In another example, the vehicle is a manned aircraft. However, various implementations are possible. The vehicle on which the system 700 is implemented can be a drone, a car, a truck, a boat, a motorcycle, or any other vehicle that can detect and avoid objects.

In operation 701, the aircraft 1000 collects data. In some implementations, the aircraft 1000 utilizes multiple types of sensors, such as the sensors 940, to collect the data. For example, the vehicle can use a first type of sensor 940 to collect environmental data corresponding to environmental conditions and a second type of sensor 940 to collect external data corresponding to an external object within a detection range of the second type of sensor 940. The environmental data collected by the first type of sensor 940 is environmental data. The environmental data can include, but is not limited to, at least one of communication latency, latency of the processor, decision time of an operator, response time of the aircraft 1000, speed of the aircraft 1000, turn rate limitations of the aircraft 1000, weather surrounding the aircraft 1000, or protection volume requirements.

Communication latency refers to latency of communication resulting from any communication or data links within the electronic device 900 or linked via transceiver 910 or communicating with external device 945. These communications may be audio, data, or a combination of both. Latency of the processor refers to the latency of the processing time with the electronic device 900, any processing within systems linked via transceiver 910, and any processing within external device 945. The decision time refers to the latency of human users operating within the method 800 and may be located on the aircraft 1000 or remotely in the case of remotely piloted aircraft. The response time of the aircraft 1000 refers to the time related to aircraft dynamics between the input of a command to commence a maneuver and when the aircraft actually commences the maneuver.

The external data collected by the second type of sensor 940 corresponds to a detected external object, such as the external device 945. The detected external object can be, for example, another vehicle, debris, or another object. In some implementations, an additional third type of sensor 940 is dedicated to monitoring data corresponding to the aircraft 1000 itself. For example, the third type of sensor 940 can provide status of the aircraft 1000 including, but not limited to, the velocity of the aircraft 1000, altitude of the aircraft 1000, turning radius of the aircraft 1000, turn rate of the aircraft 1000, electrical status of the aircraft 1000, and mechanical status of the aircraft 1000. In some implementations, the collected data includes the data 121 described in the description of FIGS. 1A and 1B.

In operation 703, the aircraft 1000 dynamically monitors the data collected by the sensors 940. In other words, the aircraft 1000 monitors the data collected and output by the sensors 940 in real-time for integrity. In some implementations, the processor 905 (e.g., illustrated in FIG. 9 as being coupled to sensors 940 through bus 930) of the aircraft 1000 monitors the collected data. In other implementations, the sensors 940 are configurable to monitor the data collected. The data, including the environmental and external conditions collected by the sensors 940, contribute to changes in the DAA system performance. Accordingly, by monitoring the data in real-time, the aircraft 1000 constantly evaluates the expected performance given the real-time conditions, algorithms to adjust alerts/warnings to ensure minimum system performance, and algorithms to generate an integrity flag/condition.

In one implementation, each of the sensors 940 are expected to operate at a minimum performance threshold. The aircraft 1000 monitors the data by comparing the outputs to the minimum performance threshold. When the outputs meet or exceed the minimum performance threshold, the sensors 940 are determined to be operating at sufficient capacity. When the outputs do not meet the minimum performance threshold, the sensors 940 are determined to be operating at sufficient capacity.

In another implementation, the performance of each of the sensors 940 are measured by more than one performance threshold. For example, a first threshold measures the minimum performance threshold of the sensors 940 and a second threshold measures an optimal performance threshold of the sensors 940. Sensor performance meeting the minimum performance threshold without also meeting the optimal performance threshold can indicate degradation of or a potential problem with the sensor 940, but that the sensor 940 remains at least party serviceable. For example, outputs that meet the minimum performance threshold without also meeting the optimal performance threshold can be due to environmental conditions, such as weather, electrical or mechanical issues, or in some instances, operator error. In some implementations, the performance thresholds can be set at various speed bands to measure performance at varying velocities of the aircraft 1000. For example, the minimum performance threshold may be met when the aircraft 1000 is traveling at a first velocity, but the minimum performance threshold may not be met when the aircraft 1000 is traveling at a second, higher velocity. In some implementations, a higher velocity of the aircraft 1000 corresponds to a higher performance threshold. Because a higher velocity corresponds to less time to detect and avoid an object and an increased radius of turn for the same angle of bank, the sensors 940 may be required to operate at a higher capacity when the aircraft 1000 travels at the higher velocity.

In some implementations, the outputs monitored refer to the probability of detection, such as the probability of detecting an external object. In some implementations, the outputs monitored can refer to a false alarm rate. In implementations where the probability of detection and the false alarm rate are monitored, the monitored outputs can include, but are not limited to, ambient RF noise, image texture noise, and ambient audio noise. These outputs can negatively affect the performance such that the performance is reduced below one or more of the performance thresholds.

In one implementation, the aircraft 1000 executes a Harris corner detector algorithm to measure texture. The Harris corner detector algorithm outputs a figure of merit to quantify the performance of the sensor 940. If the figure of merit indicates the texture is too great, the output of the sensor 940 is determined to be unreliable and in need of adjustment. Increased texture indicates the output may be unreliable and a false alarm rate may be too great. For example, a false alarm rate is too great if the sensor 940 is determined to pick up objects that are not present or not as close to the aircraft 1000 as determined by the sensor 940. By applying the Harris corner detector algorithm, which outputs the figure of merit, in a dynamic, i.e., real-time or live, system, the aircraft 1000 monitors the sensors 940 and outputs in real-time to provide increased monitoring ability of the DAA system.

In operation 705, based on the monitored data not meeting at least one performance threshold, the aircraft 1000 adjusts the DAA outputs. The DAA outputs can include, but are not limited to, traffic advisories and alerts. In some implementations, the adjustments of the DAA outputs are adaptive. In other words, the adjustments of the DAA outputs are performed in real-time during the movement of the aircraft 1000. In some implementations, the adjustment adjusts the inputs from the sensors 940 that are calculated to generate the DAA outputs. For example, based on cloud coverage surrounding the aircraft 1000 or the location of the sun on the horizon, one of the sensors 940 can be temporarily unreliable. Accordingly, the inputs from the particular sensor 940 can be ignored for a period of time to provide more reliable calculations and the DAA outputs are adjusted accordingly.

In various implementations, the DAA outputs are adjusted temporarily, such as for a set period of time, or adjusted until another adjustment is required. In some embodiments, the full image is used or masks are applied to remove areas of the image that exhibit characteristics that increase false alarm rates. In some embodiments, the output is subject to additional or different processing algorithms that better respond to the detected characteristics so as to improve performance. In some embodiments, the alerting time is increased based on the increased human decision times from the cognitive state of the remote pilot 114. In some embodiments, the alerting time is increased based on the increased communication latency from the communication system latency 113. In some embodiments, the vehicle is slowed down in operation 155 to increase the time remaining to act and improve the vehicle dynamic maneuver response with respect to avoiding an object. In some embodiments, the separation requirements are adjusted based on class of airspace based on airspace class and characteristics 117 and a priori data 123.

Following the adjustment of the outputs, the outputs and data continue to be monitored. In some implementations, all the data measured, calculated, and output is monitored as described in operation 703. In some implementations, based on the adjustments to the DAA outputs, the aircraft 1000 determines the outputs that meet the required threshold. For example, the adjusted outputs meet or exceed the optimal performance threshold and/or the minimum performance threshold. In some implementations, additional adjustments are required and the aircraft 1000 again adjusts the DAA outputs as described in operation 705. The cycle of collecting data, monitoring, adjusting, and monitoring continues until the DAA outputs are determined to be acceptable.

In some implementations, the aircraft 1000 determines the DAA outputs remain below at least one of the performance thresholds and adjustments are or will be insufficient. The aircraft 1000 can determine adjustments will be insufficient based on a number of adjustments being reached without successfully meeting at least one of the performance thresholds or based on a period of time elapsing without successfully meeting at least one of the performance thresholds. In operation 707, based on determining that adjustments will be insufficient, the aircraft 1000 raises an integrity flag. In some implementations, the integrity flag is an alert output to an interface indicating the integrity of the DAA system is compromised. In some implementations, the system 700 includes a plurality of types of integrity flags, as discussed in the description of FIGS. 1A and 1B. For example, a first integrity flag can be raised for all traffic while a second integrity flag can be raised for a particular range of traffic aircraft speeds. As another example, the aircraft 1000 can raise an integrity flag for a particular sensor 940 or for a particular threshold that is not sufficiently met.

The integrity flag is raised, in operation 707, to an operator of the aircraft 1000. In implementations where the aircraft 1000 is manned, for example by a pilot, the integrity flag is output to the pilot as an alert. The alert can be a visual alert output on a display, such as the display 935, and/or an audio alert output by a speaker. In implementations where the aircraft 1000 is unmanned, such as a UAV, a drone, or another vehicle that is not manned by a pilot onboard the vehicle itself, the integrity flag is output as an internal communication to the aircraft 1000. In these implementations, an additional integrity can be output to an external device 945 used by an operator or monitor overseeing the aircraft 1000. In some implementations, the integrity flag is output with instructions on how to proceed. For example, the integrity flag can be accompanied by instructions to reduce speed, reduce altitude, and/or perform a landing maneuver. In some implementations, the integrity flag is accompanied by information indicating the DAA system of the aircraft 1000 is damaged, non-operational, or operating at decreased capacity, depending on the status of the DAA system.

Figure 8:
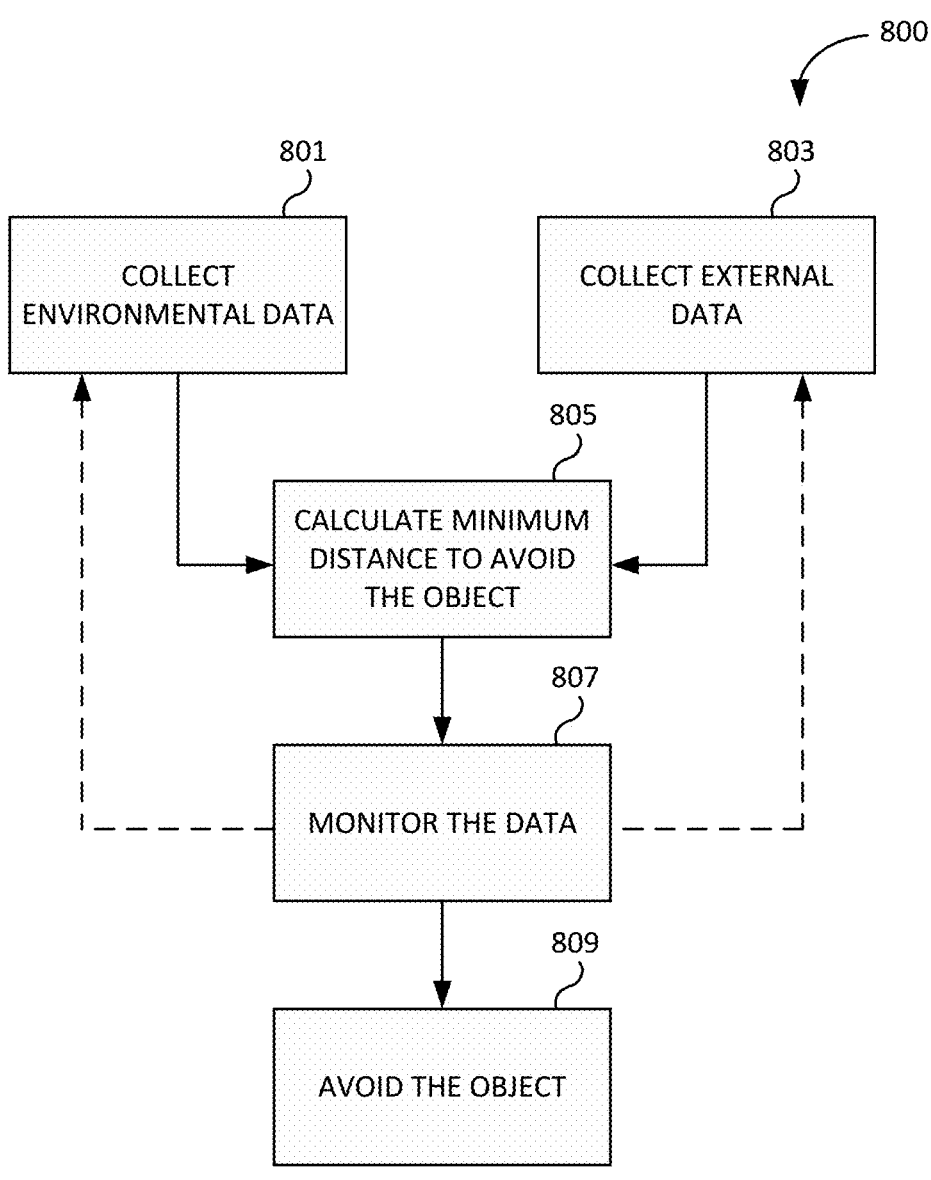
FIG. 8 illustrates a method of adaptive detection and avoidance of objects with integrity monitoring according to various implementations of the present disclosure.

FIG. 8 illustrates a method of a DAA system according to various implementations of the present disclosure. The method 800 illustrated in FIG. 8 is for illustration only. Other examples of the method 800 can be used or implemented without departing from the scope of the present disclosure. In some implementations, the method 800 is implemented on a vehicle, such as an aircraft 1000, that includes electronic components of the electronic device 900, described in greater detail with reference to FIG. 9 below. As described herein, in various implementations, the aircraft 1000 can be an unmanned aircraft, a manned aircraft, a drone, a car, a truck, a boat, a motorcycle, or any other vehicle that can detect and avoid objects.

In operation 801, environmental data is collected by a first sensor. The first sensor can be one of the sensors 940 described in the description of FIG. 9 below, such as the environmental data sensor 942. As described herein, in one implementation, the environmental data corresponds to environmental conditions in or around the aircraft 1000, such as at least one of communication latency, latency of the processor, decision time of the aircraft 1000, response time of an operator of the aircraft 1000, speed of the aircraft 1000, turn rate limitations of the aircraft 1000, weather surrounding the aircraft 1000, or protection volume requirements.

In operation 803, external data is collected by a second sensor. The second sensor can be one of the sensors 940 described in the description of FIG. 9 below, such as the external data sensor 944. As described herein, the external data corresponds to an external object within a detection range from the aircraft 1000. The external object can be, for example, another vehicle, debris, or another object. Although described herein as separate operations occurring in sequence, this description should not be construed as limiting. Operations 801 and 803 can be performed in any order or simultaneously. In some implementations, operations 801 and 803 are performed simultaneously and continuously during the execution of the method 800.

In operation 805, a minimum distance to avoid the detected external object is calculated by a processor onboard the vehicle, such as the processor 905. In various implementations, the minimum distance to avoid the detected external object is calculated according to one or more methods described in the descriptions of FIGS. 2A-6B. For example, the processor 905 can calculate the minimum distance to avoid the detected external object by utilizing at least one of a traffic collision avoidance system (TCAS) alerting logic, an Apollonius theorem, or traffic collision avoidance algorithm.

In operation 807, the environmental data and external data is monitored by the processor 905. Although described herein as operations occurring in sequence, this description should not be construed as limiting. Operations 805 and 807 can be performed simultaneously or in any order. In some implementations, the processor 905 continuously monitors the environmental data and external data during the execution of the method 800.

In some implementations, to monitor the environmental data and the external data, the processor 905 evaluates, in real-time, the outputs of the first sensor and the second sensor using a dynamic model as described herein. Based on the processor 905 determining the output of at least one of the first sensor and the second sensor is below a performance threshold, the processor 905 further adjusts an output of the at least one of the first sensor or the second sensor. In some implementations, the processor 905 further updates the calculated minimum distance to avoid the external object in response to the adjusted output of the at least one of the first sensor or the second sensor. In some implementations, after adjusting the output of the at least one of the first sensor or the second sensor, the processor 905 determines the output remains below the performance threshold and outputs, to an interface, an alert such as an integrity flag.

In operation 809, the aircraft 1000 avoids the detected external object based on the calculated minimum distance and the monitored environmental data and external data. The avoidance of the object can include one or more of a speed reduction, a turn, a roll, an altitude change, or any other suitable maneuver that avoids the object. In implementations where the aircraft 1000 is unmanned, the processor 905 executes an avoidance protocol to avoid the object. In implementations where the aircraft 1000 is manned, the avoidance maneuver is executed by an operator the aircraft 1000, such as the pilot. In other implementations where the aircraft 1000 is manned, the processor 905 automatically controls to execute the avoidance maneuver.

In some implementations, the processor 905 executes a Harris corner detector algorithm using the external data collected by the second sensor, outputs a figure of merit based on the execution of the Harris corner detector algo-rithm, and updates the minimum calculated distance to avoid the external object in response to the output figure of merit.

Figure 9:
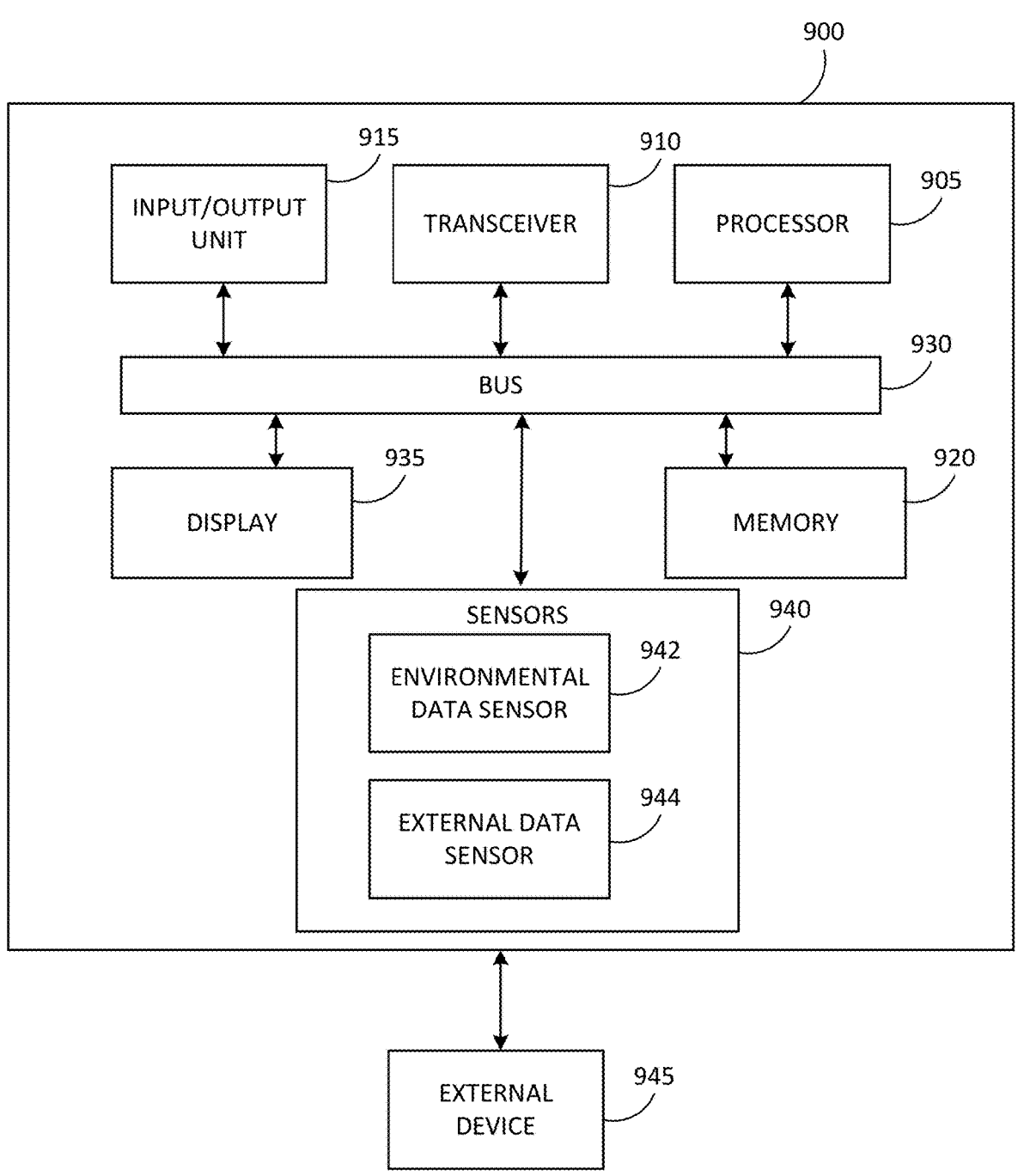
FIG. 9 illustrates an electronic device according to various implementations of the present disclosure.

FIG. 9 illustrates an electronic device according to various implementations of the present disclosure. The example of the electronic device 900 illustrated in FIG. 9 is for illustration only. Other examples of the electronic device 900 can be used without departing from the scope of the present disclosure.

In some implementations, the electronic device 900 is onboard a vehicle, such as the aircraft 1000. In other implementations, the electronic device 900 is onboard a vehicle such as a manned aircraft, an unmanned aircraft, a drone, a car, a truck, a boat, a motorcycle, or any other vehicle that can detect and avoid objects. In other implementations, the electronic device 900 is a vehicle, such as the aircraft 1000, and includes additional electrical and mechanical elements such as wings, landing gear, etc.

The electronic device 900 includes a processor 905, a transceiver 910, an input/output (I/O) unit 915, a memory, or medium, 920, and a display 935. The processor 905, the transceiver 910, the I/O unit 915, and the memory 920 are connected to one another by a bus 930 to send messages between each of the components of the electronic device 900. The memory 920 further includes a storage to store data and various programs. The programs include an operating system and one or more applications that are executed by the processor 905.

The processor 905 is configured to execute the operating system and the one or more applications stored in the memory 920. The applications include particular program code executed by the processor 905 that performs one or more of the functions described in greater detail below.

The transceiver 910 is configured to send and receive signals to and from, respectively, the electronic device 900. For example, the transceiver 910 sends and receives signals to an external device, such as a user equipment (UE), a server, or any other suitable electronic device.

The I/O unit 915 is configured to allow the electronic device 900 to directly connect to another device. For example, the I/O unit 915 includes one or more ports configured to allow connections to and from the electronic device 900.

The display 935 is configured to display information to an operator of the electronic device 900. For example, the display 935 is configured to display the integrity flag when the integrity flag is output to the aircraft 1000 as described above in operation 707. In some implementations, the display 935 is a touch screen.

The electronic device 900 optionally includes or is connected to one or more sensors 940. The sensors 940 include at least two sensors, a first sensor, also referred to as an environmental data sensor, 942 and a second sensor, also referred to as an external data sensor, 944. The sensors 940 can include various types of sensors. The types of sensors 940 can include, but are not limited to, electrooptical sensors, a barometer, a temperature sensor, a force sensor, a torque sensor, a velocity sensor, a location system for a global positioning system (GPS), an accelerometer, a gyroscope, and a radar sensor. As described herein, the sensors 940 can be monitored in real-time by the processor 905 while collecting data.

In some implementations, the electronic device 900 is connected to an external device 945. In some implementations, the external device 945 can be an electronic device similar to the electronic device 900. For example, the external device 945 can be an electronic device used by an external operator of the electronic device 900. In some implementations, where the electronic device 900 is an unmanned aircraft, the external device 945 is an electronic device with a user interface that allows a remote operator to man and/or observe the electronic device 900 during flight.

Although described in connection with the electronic device 900, examples of the disclosure are capable of implementation with numerous other general-purpose or special-purpose computing system environments, configurations, or devices. Implementations of well-known computing systems, environments, and/or configurations that are suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, VR devices, holographic device, and the like. Such systems or devices accept input from the user in any way, including from input devices such as a keyboard or pointing device, via gesture input, proximity input (such as by hovering), and/or via voice input.

Implementations of the disclosure are described in the general context of computer-executable instructions, such as program modules, executed by one or more computers or other devices in software, firmware, hardware, or a combination thereof. In one example, the computer-executable instructions are organized into one or more computer-executable components or modules. Generally, program modules include, but are not limited to, routines, programs, objects, components, and data structures that perform particular tasks or implement particular abstract data types. In one example, aspects of the disclosure are implemented with any number and organization of such components or modules. For example, aspects of the disclosure are not limited to the specific computer-executable instructions or the specific components or modules illustrated in the figures and described herein. Other examples of the disclosure include different computer-executable instructions or components having more or less functionality than illustrated and described herein. In implementations involving a general-purpose computer, aspects of the disclosure transform the general-purpose computer into a special-purpose computing device when configured to execute the instructions described herein.

Figure 10:
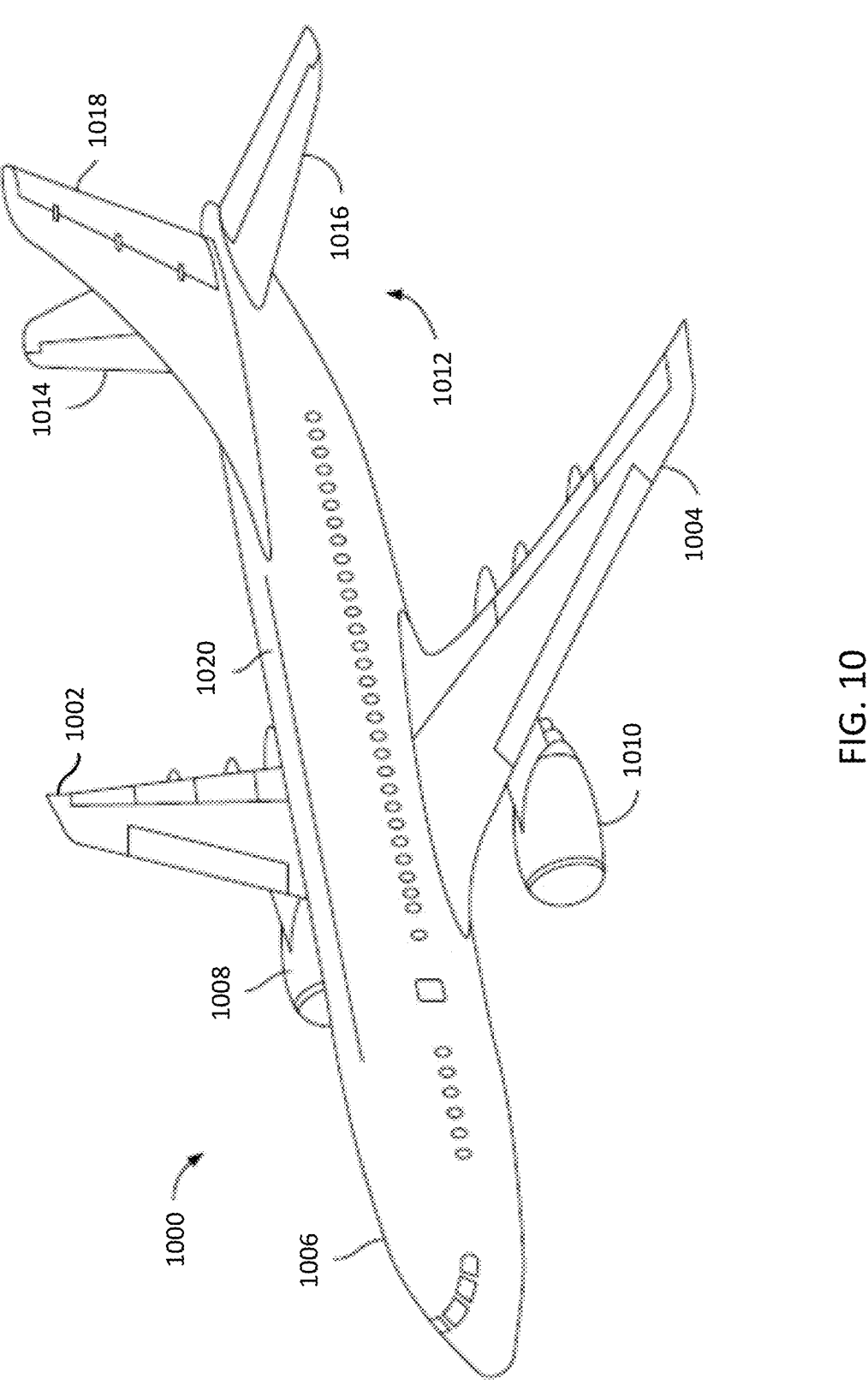
FIG. 10 illustrates a schematic perspective view of an aircraft which can perform adaptive detection and avoidance of objects with integrity monitoring according to various implementations of the present disclosure.

FIG. 10 illustrates a schematic perspective view of an aircraft on which a DAA system, such as the DAA system implementing the method 100, is implemented according to various implementations of the present disclosure. The aircraft 1000 includes a wing 1002 and a wing 1004 attached to a body 1006. The aircraft 1000 also includes an engine 1008 attached to the wing 1002 and an engine 1010 attached to the wing 1004. The body 1006 has a tail section 1012 with a horizontal stabilizer 1014, a horizontal stabilizer 1016, and a vertical stabilizer 1018 attached to the tail section 1012 of the body 1006. The body 1006 in some examples has a composite skin 1020.

The aircraft 1000 is an example of an aircraft on which a DAA system is implemented. As described herein, the aircraft 1000 collects data including an external object, calculates a minimum distance to avoid the external object, monitors the collected data, and avoids the external object. In some implementations, the aircraft 1000 further adjusts an output of the sensors based on the performance not meeting a performance threshold and, where the adjustment does not sufficiently raise the performance of the sensor, outputs an integrity flag to an interface.

The illustration of the aircraft 1000 is not meant to imply physical or architectural limitations to the manner in which an illustrative configurations can be implemented. For example, although the aircraft 1000 is a commercial aircraft, the aircraft 1000 can be a military aircraft, a rotorcraft, a helicopter, an unmanned aerial vehicle, or any other suitable aircraft.

Additionally, although the illustrative examples are described with respect to an aircraft, the present disclosure can be applied to other types of platforms. The platform can be, for example, a mobile platform, a stationary platform, a land-based structure, an aquatic-based structure, and a space-based structure. More specifically, the platform can be a surface ship, a tank, a personnel carrier, a train, a spacecraft, a space station, a satellite, a submarine, an automobile, a power plant, a bridge, a dam, a house, a windmill, a manufacturing facility, a building, and other suitable platforms.

Figure 11:
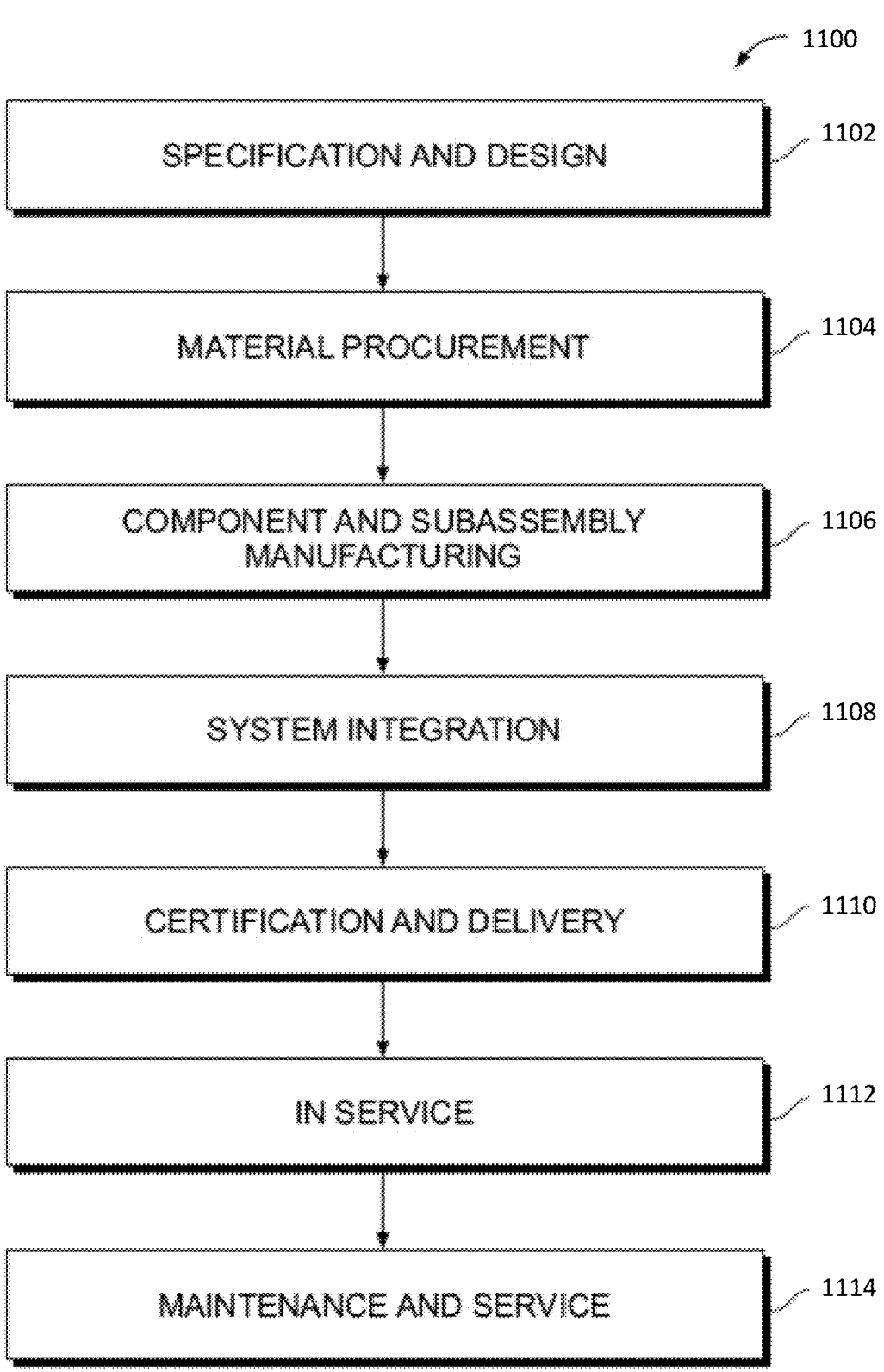
FIG. 11 illustrates a block diagram of an aircraft production and service methodology according to various implementations of the present disclosure.

FIG. 11 illustrates a block diagram of an aircraft production and service methodology in which various examples can be implemented. Examples of the disclosure can be described in the context of an aircraft manufacturing and service method 1100 as shown in FIG. 11. During preproduction, the method 1100 can include specification and design 1102 of an aircraft (e.g., the aircraft 1000 shown in FIG. 10) and material procurement 1104. During production, component and subassembly manufacturing 1106 and system integration 1108 of the aircraft take place. In various implementations, the system integration 1108 includes the installation and storage of the DAA system described herein. Thereafter, the aircraft 1000 can go through certification and delivery 1110 to be placed in service 1112. While in service by a customer, the aircraft 1000 is scheduled for routine maintenance and service 1114 (which can also include modification, reconfiguration, refurbishment, and so on).

Each of the processes of the method 1100 can be performed or carried out by a system integrator, a third party, and/or an operator (e.g., a customer). For the purposes of this description, a system integrator can include, without limitation, any number of aircraft manufacturers and major-system subcontractors; a third party can include, without limitation, any number of vendors, subcontractors, and suppliers; and an operator can be an airline, leasing company, military entity, service organization, and so on.

It should be noted that any number of other systems can be included with the system described herein. Also, although an aerospace example is shown, the principles can be applied to other industries, such as the automotive industry.

The illustration of the manufacturing environment described herein is not meant to imply physical or architectural limitations to the manner in which an illustrative example is implemented. Other components in addition to or in place of the ones illustrated can be used. Some components can be removed. Also, the blocks are presented to illustrate some functional components. One or more of these blocks can be combined, divided, or combined and divided into different blocks when implemented in an illustrative example.

By way of example and not limitation, computer readable media comprise computer storage media and communication media can be implemented in one or more examples, such as by the processor 905. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. In one example, computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium used to store information for access by a computing device. In contrast, communication media typically embody computer readable instructions, data structures, program modules, or the like in a modulated data signal such as a carrier wave or other transport mechanism and include any information delivery media.

As indicated above, program code instructions may be stored in memory, and executed by processing circuitry that is thereby programmed, to implement functions of the systems, subsystems, tools, and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded, and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. It will also be understood that one or more functions, and combinations of functions, may be implemented by special purpose hardware-based computer systems and/or processing circuitry s which perform the specified functions, or combinations of special purpose hardware and program code instructions.

The following clauses describe further aspects of the present disclosure. In some implementations, the clauses described below can be further combined in any sub-combination without departing from the scope of the present disclosure.

Clause Set A:

A1: An apparatus for avoidance, the apparatus comprising:

a first sensor configured to collect environmental data;

a second sensor configured to collect external data corresponding to an external object within a detection range from the apparatus; and a processor configured to, in real-time:

calculate a minimum distance to avoid the external object, based at least in part on the environmental data and the external data, monitor the environmental data and the external data, and control the apparatus to avoid the external object based on the calculated minimum distance and the monitored environmental data and external data.

A2: The apparatus of clause A1, wherein the processor is further configured to:

monitor the environmental data and the external data, evaluate, in real-time, an output of the first sensor and an output of the second sensor using a dynamic model, determine the output of at least one of the first sensor or the second sensor is below a performance threshold, and adjust an output of the at least one of the first sensor or the second sensor in response to the determination the output of the at least one of the first sensor or the second sensor is below the performance threshold.

A3: The apparatus of clause A2, wherein the processor is further configured to: after adjusting the output of the at least one of the first sensor or the second sensor, determine the output remains below the performance threshold, and based on the output remaining below the performance threshold, output, to an interface, an alert.

A4: The apparatus of clause A2, wherein the processor is further configured to update the calculated minimum distance to avoid the external object in response to the adjusted output of the at least one of the first sensor or the second sensor.

A5: The apparatus of clause A1, wherein the processor is configured to:

execute a Harris corner detector algorithm using the external data collected by the second sensor;

output a figure of merit based on the execution of the Harris corner detector algorithm; and update the calculated minimum distance to avoid the external object in response to the output figure of merit.

A6: The apparatus of clause A1, wherein the environmental data includes at least one of communication latency, latency of the processor, decision time of the apparatus, response time of the apparatus, speed of the apparatus, turn rate limitations of the apparatus, weather surrounding the apparatus, or protection volume requirements.

A7: The apparatus of clause A1, wherein:

the apparatus is located on an aircraft, and the processor is further configured to calculate the minimum distance to avoid the external object based at least in part on a turning radius of the aircraft.

A8: The apparatus of clause A7, wherein:
the detection range is a spherical range surrounding the apparatus, and
the processor is further configured to calculate the minimum distance to avoid the external object and monitor the environmental data and external data in-flight.

A9: The apparatus of clause A1, wherein, to calculate the minimum distance, the processor is configured to utilize at least one of a traffic collision avoidance system (TCAS) alerting logic, an Apollonius theorem, or traffic collision avoidance algorithm.

Clause Set B:
B1: A method for avoidance, the method comprising:
collecting, via a first sensor, environmental data;
collecting, via a second sensor, external data corresponding to an external object within a detection range;
calculating, in real-time, a minimum distance to avoid the external object, based at least in part on the environmental data and the external data;
monitoring, in real-time, the environmental data and the external data; and
avoiding the external object based on the calculated minimum distance and the monitored environmental data and external data.

B2: The method of clause B1, further comprising:
to monitor the environmental data and the external data, evaluating, in real-time, an output of the first sensor and an output of the second sensor using a dynamic model,
determining the output of at least one of the first sensor or the second sensor is below a performance threshold, and
adjusting an output of the at least one of the first sensor or the second sensor in response to the determination the output of the at least one of the first sensor or the second sensor is below the performance threshold.

B3: The method of clause B2, further comprising:
after adjusting the output of the at least one of the first sensor or the second sensor, determining the output remains below the performance threshold, and
based on the output remaining below the performance threshold, outputting, to an interface, an alert.

B4: The method of clause B2, further comprising updating the calculated minimum distance to avoid the external object in response to the adjusted output of the at least one of the first sensor or the second sensor.

B5: The method of clause B1, further comprising:
executing a Harris corner detector algorithm using the external data collected by the second sensor;
outputting a figure of merit based on the execution of the Harris corner detector algorithm; and
updating the calculated minimum distance to avoid the external object in response to the output figure of merit.

B6: The method of clause B1, wherein the environmental data includes at least one of communication latency, latency of a processor, decision time of an apparatus executing the method, response time of the apparatus, speed of the apparatus, turn rate limitations of the apparatus, weather surrounding the apparatus, or protection volume requirements.

B7: The method of clause B1, wherein:
the method is performed by an aircraft, and
the method further comprises calculating the minimum distance to avoid the external object based at least in part on a turning radius of the aircraft.

B8: The method of clause B7, wherein:
the detection range is a spherical range surrounding the aircraft, and
the method further comprises calculating the minimum distance to avoid the external object and monitoring the environmental data and external data in-flight.

B9: The method of clause B1, wherein, to calculate the minimum distance, the method further comprises utilizing at least one of a traffic collision avoidance system (TCAS) alerting logic, an Apollonius theorem, or traffic collision avoidance algorithm.

Clause Set C:
C1: A computer program product comprising a computer usable medium having a computer readable program code embodied therein, the computer readable program code adapted to be executed, for avoidance, to:
control a first sensor to collect environmental data;
control a second sensor to collect external data corresponding to an external object within a detection range;
calculate, in real-time, a minimum distance to avoid the external object, based at least in part on the environmental data and the external data;
monitor, in real-time, the environmental data and the external data; and
control to avoid the external object based on the calculated minimum distance and the monitored environmental data and external data.

C2: The computer program product of clause C1, wherein the computer readable program code is further adapted, to:
to monitor the environmental data and the external data, evaluate, in real-time, an output of the first sensor and an output of the second sensor using a dynamic model;
determine the output of at least one of the first sensor or the second sensor is below a performance threshold;
adjust an output of the at least one of the first sensor or the second sensor in response to the determination the output of the at least one of the first sensor or the second sensor is below the performance threshold.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one implementation or may relate to several implementations. The implementations are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It is to be understood that the above description is intended to be illustrative, and not restrictive. As an illustration, the above-described implementations (and/or aspects thereof) are usable in combination with each other. In addition, many modifications are practicable to adapt a particular situation or material to the teachings of the various implementations of the disclosure without departing from their scope. While the dimensions and types of materials described herein are intended to define the parameters of the various implementations of the disclosure, the implementations are by no means limiting and are exemplary implementations. Many other implementations will be apparent to those of ordinary skill in the art upon reviewing the above description. The scope of the various implementations of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various implementations of the disclosure, including the best mode, and also to enable any person of ordinary skill in the art to practice the various implementations of the disclosure, including making and using any devices or systems and performing any incorporated methods. The patentable scope of the various implementations of the disclosure is defined by the claims, and includes other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

Although the present disclosure has been described with reference to various implementations, various changes and modifications can be made without departing from the scope of the present disclosure.

What is claimed is:

1. An apparatus for avoidance, the apparatus comprising:
a first sensor configured to collect environmental data, wherein the environmental data includes data associated with one or more conditions in or around a vehicle associated with the apparatus;
a second sensor configured to collect external data corresponding to an external object detected within a detection range from the apparatus; and
a processor coupled to the first sensor and the second sensor, the processor configured to, in real-time:
calculate a minimum distance to avoid the external object, based at least in part on the environmental data, the external data, and a volume of space, wherein the volume of space is determined, where a collision between the vehicle and the external object is calculated to occur, in a direction of the vehicle;
monitor the environmental data and the external data;
compare a designed sensor performance of one or more of the first sensor or the second sensor to the calculated minimum distance, wherein the designed sensor performance is information associated with performance of the one or more of the first sensor or the second sensor, based on speed of the vehicle, and wherein the designed sensor performance is stored in a memory of the apparatus;
determine that one or more of the first sensor or the second sensor cannot meet a safety condition, based on the speed of the vehicle, to provide sufficient alerting to maintain separation against all traffic in response to the comparison of the designed sensor performance of one or more of the first sensor or the second sensor to the calculated minimum distance;
control the apparatus to reestablish meeting of the safety condition to provide sufficient alerting to maintain separation against all traffic based on the determination that one or more of the first sensor or the second sensor cannot provide sufficient alerting to maintain the separation against all traffic; and
control the apparatus to avoid the external object based on the calculated minimum distance and the monitored environmental data and the external data, wherein the environmental data from the first sensor includes at least one of: communication latency, latency of the processor, decision time of the apparatus, or response time of the apparatus that corresponds to a time period between an input to commence a maneuver and when the vehicle commences the maneuver.

2. The apparatus of claim 1, wherein the processor is further configured to:
monitor the environmental data and the external data,
evaluate, in real-time, an output of the first sensor and an output of the second sensor using a dynamic model,
determine if at least one of the output of the first sensor or the output of the second sensor is below a performance threshold, and

adjust the at least one of the output of the first sensor or the output of the second sensor in response to the determination that the output of the at least one of the first sensor or the second sensor is below the performance threshold.

3. The apparatus of claim 2, wherein the processor is further configured to:

after adjusting the at least one of the output of the first sensor or the output of the second sensor, determine that the at least one of the output of the first sensor or the output of the second sensor remains below the performance threshold, and based on the output remaining below the performance threshold, output, to an interface, an alert.

4. The apparatus of claim 2, wherein the processor is further configured to update the calculated minimum distance to avoid the external object in response to the adjusted output of the at least one of the first sensor or the second sensor.

5. The apparatus of claim 1, wherein the processor is configured to: execute a Harris corner detector algorithm using the external data collected by the second sensor;

output a figure of merit based on the execution of the Harris corner detector algorithm; and update the calculated minimum distance to avoid the external object in response to the output figure of merit.

6. The apparatus of claim 1, wherein:

the apparatus is located on an aircraft, and the processor is further configured to calculate the minimum distance to avoid the external object based at least in part on a turning radius of the aircraft.

7. The apparatus of claim 6, wherein:

the detection range is a spherical range surrounding the apparatus, and the processor is further configured to calculate the minimum distance to avoid the external object and monitor the environmental data and external data in-flight.

8. The apparatus of claim 1, wherein, to calculate the minimum distance, the processor is configured to utilize at least one of a traffic collision avoidance system (TCAS) alerting logic, an Apollonius theorem, or a traffic collision avoidance algorithm.

9. The apparatus of claim 1, wherein the environmental data further includes at least one of: turn rate limitations of the apparatus, weather surrounding the apparatus, or protection volume requirements.

10. A method for avoidance, the method comprising:

collecting, via a first sensor, environmental data, wherein the environmental data includes data associated with one or more conditions in or around a vehicle;

collecting, via a second sensor, external data corresponding to an external object detected within a detection range;

calculating, via a processor coupled to the first sensor and the second sensor of an apparatus, in real-time, a minimum distance to avoid the external object, based at least in part on the environmental data, the external data, and a volume of space, wherein the volume of space is determined, where a collision between the vehicle and the external object is calculated to occur, in a direction of the vehicle;

monitoring, in real-time, the environmental data and the external data;

comparing a designed sensor performance of one or more of the first sensor or the second sensor to the calculated minimum distance,

wherein the designed sensor performance is information associated with performance of the one or more of the first sensor or the second sensor, based on speed of the vehicle, and wherein the designed sensor performance is stored in a memory of the apparatus;

determining that one or more of the first sensor or the second sensor cannot meet a safety condition, based on the speed of the vehicle, to provide sufficient alerting to maintain separation against all traffic in response to the comparison of the designed sensor performance of one or more of the first sensor or the second sensor to the calculated minimum distance;

controlling the apparatus to reestablish meeting of the safety condition to provide sufficient alerting to maintain separation against all traffic based on the determination that one or more of the first sensor or the second sensor cannot provide sufficient alerting to maintain the separation against all traffic; and avoiding the external object based on the calculated minimum distance and the monitored environmental data and external data, wherein the environmental data from the first sensor includes at least one of:

communication latency, latency of the processor, decision time of the apparatus, or response time of the apparatus that corresponds to a time period between an input to commence a maneuver and when the vehicle commences the maneuver.

11. The method of claim 10, further comprising:

monitoring the environmental data and the external data, evaluating, in real-time, an output of the first sensor and an output of the second sensor using a dynamic model, determining at least one of the output of the first sensor or the output of the second sensor is below a performance threshold, and adjusting an output of the at least one of the first sensor or the second sensor in response to the determination that the output of the at least one of the first sensor or the second sensor is below the performance threshold.

12. The method of claim 11, further comprising:

after adjusting the output of the at least one of the first sensor or the second sensor, determining the output remains below the performance threshold, and based on the output remaining below the performance threshold, outputting, to an interface, an alert.

13. The method of claim 11, further comprising updating the calculated minimum distance to avoid the external object in response to the adjusted output of the at least one of the first sensor or the second sensor.

14. The method of claim 10, further comprising:

executing a Harris corner detector algorithm using the external data collected by the second sensor;

outputting a figure of merit based on the execution of the Harris corner detector algorithm; and updating the calculated minimum distance to avoid the external object in response to the output figure of merit.

15. The method of claim 10, wherein:

the method is performed by an aircraft, and the method further comprises calculating the minimum distance to avoid the external object based at least in part on a turning radius of the aircraft.

16. The method of claim 15, wherein:

the detection range is a spherical range surrounding the aircraft, and wherein the method further comprises:

calculating the minimum distance to avoid the external object and monitoring the environmental data and external data in-flight.

17. The method of claim 10, wherein, calculating the minimum distance further comprises:

utilizing at least one of a traffic collision avoidance system (TCAS) alerting logic, an Apollonius theorem, or a traffic collision avoidance algorithm.

18. The method of claim 10, wherein the environmental data includes at least one of: turn rate limitations of the apparatus, weather surrounding the apparatus, or protection volume requirements.

19. A non-transitory computer program product comprising a computer usable medium having a computer readable program code embodied therein, the computer readable program code adapted to be executed, for avoidance, to:

control a first sensor to collect environmental data, wherein the environmental data includes data associated with one or more conditions in or around a vehicle;

control a second sensor to collect external data corresponding to an external object detected within a detection range;

calculate, via a processor coupled to the first sensor and the second sensor of an apparatus, in real-time, a minimum distance to avoid the external object, based at least in part on the environmental data, the external data, and a volume of space, wherein the volume of space is determined, where a collision between the vehicle and the external object is calculated to occur, in a-direction of the vehicle;

monitor, in real-time, the environmental data and the external data;

compare a designed sensor performance of one or more of the first sensor or the second sensor to the calculated minimum distance, wherein the designed sensor performance is information associated with performance of the one or more of the first sensor or the second sensor, based on speed of the vehicle, and wherein the designed sensor performance is stored in a memory of the apparatus;

determine that one or more of the first sensor or the second sensor cannot meet a safety condition, based on the speed of the vehicle, to provide sufficient alerting to maintain separation against all traffic in response to the comparison of the designed sensor performance of one or more of the first sensor or the second sensor to the calculated minimum distance;

control the apparatus to reestablish meeting of the safety condition to provide sufficient alerting to maintain separation against all traffic based on the determination that one or more of the first sensor or the second sensor cannot provide sufficient alerting to maintain separation against all traffic; and control to avoid the external object based on the calculated minimum distance and the monitored environmental data and external data, wherein the environmental data from the first sensor includes at least one of: communication latency, latency of the processor, decision time of the apparatus, or response time of the apparatus that corresponds to a time period between an input to commence a maneuver and when the vehicle commences the maneuver.

20. The non-transitory computer program product of claim 19, wherein the computer readable program code is further adapted, to:

to monitor the environmental data and the external data;

evaluate, in real-time, an output of the first sensor and an output of the second sensor using a dynamic model;

determine that the output of at least one of the first sensor or the second sensor is below a performance threshold; and adjust an output of the at least one of the first sensor or the second sensor in response to the determination that the output of the at least one of the first sensor or the second sensor is below the performance threshold.

* * * * *